US012367585B2

United States Patent
Zhang et al.

(10) Patent No.: US 12,367,585 B2
(45) Date of Patent: Jul. 22, 2025

(54) UTILIZING MACHINE LEARNING MODELS TO GENERATE REFINED DEPTH MAPS WITH SEGMENTATION MASK GUIDANCE

(71) Applicant: Adobe Inc., San Jose, CA (US)

(72) Inventors: Jianming Zhang, Campbell, CA (US); Soo Ye Kim, Daejeon (KR); Simon Niklaus, San Jose, CA (US); Yifei Fan, Santa Clara, CA (US); Su Chen, San Jose, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 598 days.

(21) Appl. No.: 17/658,873

(22) Filed: Apr. 12, 2022

(65) Prior Publication Data

US 2023/0326028 A1    Oct. 12, 2023

(51) Int. Cl.
  *G06T 7/11*    (2017.01)
  *G06T 7/215*   (2017.01)
  *G06T 7/50*    (2017.01)

(52) U.S. Cl.
  CPC .............. *G06T 7/11* (2017.01); *G06T 7/215* (2017.01); *G06T 7/50* (2017.01); *G06T 2207/20084* (2013.01)

(58) Field of Classification Search
  None
  See application file for complete search history.

(56) References Cited

U.S. PATENT DOCUMENTS

| | | | |
|---|---|---|---|
| 2008/0123960 A1* | 5/2008 | Kim | G06V 10/28 382/173 |
| 2018/0068450 A1* | 3/2018 | Yuan | G06T 7/194 |
| 2023/0139772 A1* | 5/2023 | Wang | G06N 3/08 345/419 |
| 2023/0252658 A1* | 8/2023 | Cai | G06T 7/11 382/100 |
| 2024/0394893 A1* | 11/2024 | Qi | G06T 7/11 |

OTHER PUBLICATIONS

Lin, Xiao, et al. "Depth estimation and semantic segmentation from a single RGB image using a hybrid convolutional neural network." Sensors 19.8 (2019): 1795. (Year: 2019).*

(Continued)

*Primary Examiner* — Matthew C Bella
*Assistant Examiner* — Johnny B Duong
(74) *Attorney, Agent, or Firm* — Keller Preece PLLC

(57) ABSTRACT

The present disclosure relates to systems, non-transitory computer-readable media, and methods for utilizing machine learning models to generate refined depth maps of digital images utilizing digital segmentation masks. In particular, in one or more embodiments, the disclosed systems generate a depth map for a digital image utilizing a depth estimation machine learning model, determine a digital segmentation mask for the digital image, and generate a refined depth map from the depth map and the digital segmentation mask utilizing a depth refinement machine learning model. In some embodiments, the disclosed systems generate first and second intermediate depth maps using the digital segmentation mask and an inverse digital segmentation mask and merger the first and second intermediate depth maps to generate the refined depth map.

20 Claims, 15 Drawing Sheets

(56) References Cited

OTHER PUBLICATIONS

Han, Xiaoning, et al. "A plane extraction approach in inverse depth images based on region-growing." Sensors 21.4 (2021): 1141. (Year: 2021).*
Filling Holes in an Image Using OpenCV ( Python / C++) | LearnOpenCV #. Nov. 23, 2015, https://web.archive.org/web/20151128060314/https://learnopencv.com/filling-holes-in-an-image-using-opencv-python-c/. (Year: 2015).*
Meng, Yue, et al. "Signet: Semantic instance aided unsupervised 3d geometry perception." Proceedings of the IEEE/CVF conference on Computer Vision and Pattern Recognition. 2019. (Year: 2019).*
Ishii, Yasunori, and Takayoshi Yamashita. "Cutdepth: Edge-aware data augmentation in depth estimation." arXiv preprint arXiv:2107.07684 (2021). (Year: 2021).*
Gu, Shuo, et al. "3-d lidar+ monocular camera: An inverse-depth-induced fusion framework for urban road detection." IEEE Transactions on Intelligent Vehicles 3.3 (2018): 351-360. (Year: 2018).*
Amir Atapour Abarghouei and Toby P. Breckon. Real-Time Monocular Depth Estimation Using Synthetic Data With Domain Adaptation via Image Style Transfer. In IEEE Conference on Computer Vision and Pattern Recognition, 2018.
AdobeStock. Website with a collection of licensed images. https://stock.adobe.com/. [Online; accessed Nov. 16, 2021].
Jimmy Lei Ba, Jamie Ryan Kiros, and Geoffrey E. Hinton. Layer normalization. arXiv/1607.06450, 2016.
Daniel J. Butler, Jonas Wulff, Garrett B. Stanley, and Michael J. Black. A Naturalistic Open Source Movie for Optical Flow Evaluation. In European Conference on Computer Vision, 2012.
Tian Chen, Shijie An, Yuan Zhang, Chongyang Ma, Huayan Wang, Xiaoyan Guo, and Wen Zheng. Improving Monocular Depth Estimation by Leveraging Structural Awareness and Complementary Datasets. In European Conference on Computer Vision, 2020.
Weifeng Chen, Zhao Fu, Dawei Yang, and Jia Deng. Single-Image Depth Perception in the Wild. In Advances in Neural Information Processing Systems, 2016.
Ming-Ming Cheng, Niloy J. Mitra, Xiaolei Huang, Philip H. S. Torr, and Shi-Min Hu. Global Contrast Based Salient Region Detection. IEEE Transactions on Pattern Analysis and Machine Intelligence, 37(3):569-582, 2015.
Marius Cordts, Mohamed Omran, Sebastian Ramos, Timo Rehfeld, Markus Enzweiler, Rodrigo Benenson, Uwe Franke, Stefan Roth, and Bernt Schiele. The Cityscapes Dataset for Semantic Urban Scene Understanding. In IEEE Conference on Computer Vision and Pattern Recognition, 2016.
Jia Deng, Wei Dong, Richard Socher, Li-Jia Li, Kai Li, and Fei-Fei Li. ImageNet: A Large-Scale Hierarchical Image Database. In IEEE Conference on Computer Vision and Pattern Recognition, 2009.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An Image is Worth 16x16 Words: Transformers for Image Recognition at Scale. In International Conference on Learning Representations, 2021.
Huan Fu, Mingming Gong, Chaohui Wang, Kayhan Batmanghelich, and Dacheng Tao. Deep Ordinal Regression Network for Monocular Depth Estimation. In IEEE Conference on Computer Vision and Pattern Recognition, 2018.
Ravi Garg, B. G. Vijay Kumar, Gustavo Carneiro, and Ian D. Reid. Unsupervised CNN for Single View Depth Estimation: Geometry to the Rescue. In European Conference on Computer Vision, 2016.
Clement Godard, Oisin Mac Aodha, and Gabriel J. Brostow. Unsupervised Monocular Depth Estimation With Left-Right Consistency. In IEEE Conference on Computer Vision and Pattern Recognition, 2017.
Qibin Hou, Ming-Ming Cheng, Xiaowei Hu, Ali Borji, Zhuowen Tu, and Philip H. S. Torr. Deeply Supervised Salient Object Detection with Short Connections. IEEE Transactions on Pattern Analysis and Machine Intelligence, 41(4):815-828, 2019.
Tak-Wai Hui, Chen Change Loy, and Xiaoou Tang. Depth Map Super-Resolution by Deep Multi-Scale Guidance. In European Conference on Computer Vision, 2016.
Saif Imran, Xiaoming Liu, and Daniel Morris. Depth Completion with Twin-Surface Extrapolation at Occlusion Boundaries. InIEEE Conference on Computer Vision and Pattern Recognition, 2021.
Jianbo Jiao, Ying Cao, Yibing Song, and Rynson Lau. Look Deeper into Depth: Monocular Depth Estimation with Semantic Booster and Attention-Driven Loss. In European Conference on Computer Vision, 2018.
Tobias Koch, Lukas Liebel, Friedrich Fraundorfer, and Marco Korner. Evaluation of CNN-based Single-Image Depth Estimation Methods. InEuropean Conference on Computer Vision Workshops, 2018.
Jae-Han Lee and Chang-Su Kim. Multi-Loss Rebalancing Algorithm for Monocular Depth Estimation. In European Conference on Computer Vision, 2020.
Zhengqi Li and Noah Snavely. MegaDepth: Learning Single-View Depth Prediction From Internet Photos. In IEEE Conference on Computer Vision and Pattern Recognition, 2018.
Tsung-Yi Lin, Michael Maire, Serge Belongie, Lubomir Bourdev, Ross Girshick, James Hays, Pietro Perona, Deva Ramanan, C. Lawrence Zitnick, and Piotr Dollar. Microsoft COCO: Common Objects in Context.arXiv/1405.0312, 2014.
Ilya Loshchilov and Frank Hutter. Decoupled Weight Decay Regularization. InInternational Conference on Learning Representations, 2019.
Ziyang Ma, Kaiming He, Yichen Wei, Jian Sun, and Enhua Wu. Constant Time Weighted Median Filtering for Stereo Matching and Beyond. In IEEE International Conference on Computer Vision, 2013.
Reza Mahjourian, Martin Wicke, and Anelia Angelova. Unsupervised Learning of Depth and Ego-Motion From Monocular Video Using 3D Geometric Constraints. In IEEE Conference on Computer Vision and Pattern Recognition, 2018.
S. Mahdi H. Miangoleh, Sebastian Dille, Long Mai, Sylvain Paris, and Yagz Aksoy. Boosting Monocular Depth Estimation Models to High-Resolution via Content-Adaptive Multi-Resolution Merging. InIEEE Conference on Computer Vision and Pattern Recognition, 2021.
Arsalan Mousavian, Hamed Pirsiavash, and Jana Kosecka. Joint Semantic Segmentation and Depth Estimation With Deep Convolutional Networks. InInternational Conference on 3D Vision, 2016.
Simon Niklaus, Long Mai, Jimei Yang, and Feng Liu. 3D Ken Burns Effect from a Single Image.ACM Transactions on Graphics, 38(6):184:1-184:15, 2019.
pixabay. Website with free images that can be used for commercial and non-commercial purposes.https://pixabay.com/. [Online; accessed Nov. 16, 2021].
Xiaojuan Qi, Renjie Liao, Zhengzhe Liu, Raquel Urtasun, and Jiaya Jia. GeoNet: Geometric Neural Network for Joint Depth and Surface Normal Estimation. In IEEE Conference on Computer Vision and Pattern Recognition, 2018.
Yu Qiao, Yuhao Liu, Xin Yang, Dongsheng Zhou, Mingliang Xu, Qiang Zhang, and Xiaopeng Wei. Attention-Guided Hierarchical Structure Aggregation for Image Matting. In IEEE Conference on Computer Vision and Pattern Recognition, 2020.
Rene Ranftl, Alexey Bochkovskiy, and Vladlen Koltun. Vision Transformers for Dense Prediction. In IEEE International Conference on Computer Vision, 2021.
Rene Ranftl, Katrin Lasinger, David Hafner, Konrad Schindler, and Vladlen Koltun. Towards Robust Monocular Depth Estimation: Mixing Datasets for Zero-Shot Cross-Dataset Transfer. IEEE Transactions on Pattern Analysis and Machine Intelligence, 2020.
remove.bg. Software for removing background from images. https://www.remove.bg/upload. [Online; accessed Nov. 16, 2021].
Mike Roberts, Jason Ramapuram, Anurag Ranjan, Atulit Kumar, Miguel Angel Bautista, Nathan Paczan, Russ Webb, and Joshua M. Susskind. Hypersim: A Photorealistic Synthetic Dataset for Holistic Indoor Scene Understanding. In IEEE International Conference on Computer Vision, 2021.

(56) References Cited

OTHER PUBLICATIONS

Meng-Li Shih, Shih-Yang Su, Johannes Kopf, and Jia-Bin Huang. 3D Photography Using Context-Aware Layered Depth Inpainting. In IEEE Conference on Computer Vision and Pattern Recognition, 2020.
Xibin Song, Yuchao Dai, and Xueying Qin. Deeply Supervised Depth Map Super-Resolution as Novel View Synthesis. IEEE Transactions on Circuits and Systems for Video Technology, 29(8):2323-2336, 2019.
Alexandru Telea. An Image Inpainting Technique Based on the Fast Marching Method. Journal of Graphics Tools, 9(1):23-34, 2004.
Ilya Tolstikhin, Neil Houlsby, Alexander Kolesnikov, Lucas Beyer, Xiaohua Zhai, Thomas Unterthiner, Jessica Yung, Andreas Steiner, Daniel Keysers, Jakob Uszkoreit, Mario Lucic, and Alexey Dosovitskiy. MLP-Mixer: An all-MLP Architecture for Vision. arXiv/2105.01601, 2021.
unsplash. Website with free images that can be used for commercial and non-commercial purposes. https://unsplash.com/. [Online; accessed Nov. 16, 2021].
Ashish Vaswani, Noam Shazeer, Niki Parmar, Jakob Uszkoreit, Llion Jones, Aidan N. Gomez, Lukasz Kaiser, and Illia Polosukhin. Attention Is All You Need. In Advances in Neural Information Processing Systems, 2017.
Chaoyang Wang, Simon Lucey, Federico Perazzi, and Oliver Wang. Web Stereo Video Supervision for Depth Prediction from Dynamic Scenes. In International Conference on 3D Vision, 2019.
Lijun Wang, Huchuan Lu, Yifan Wang, Mengyang Feng, Dong Wang, Baocai Yin, and Xiang Ruan. Learning to Detect Salient Objects with Image-Level Supervision. In IEEE Conference on Computer Vision and Pattern Recognition, 201.
Lijun Wang, Jianming Zhang, Oliver Wang, Zhe Lin, and Huchuan Lu. SDC-Depth: Semantic Divide-and-Conquer Network for Monocular Depth Estimation. In IEEE Conference on Computer Vision and Pattern Recognition, 2020.
Qiang Wang, Shizhen Zheng, Qingsong Yan, Fei Deng, Kaiyong Zhao, and Xiaowen Chu. Irs: A Large Naturalistic Indoor Robotics Stereo Dataset to Train Deep Models for Disparity and Surface Normal Estimation.arXiv/1912.09678, 2019.
Wenshan Wang, Delong Zhu, Xiangwei Wang, Yaoyu Hu, Yuheng Qiu, Chen Wang, Yafei Hu, Ashish Kapoor, and Sebastian Scherer. TartanAir: A Dataset to Push the Limits of Visual SLAM. InIEEE International Conference on Intelligent Robots and Systems, 2020.
Yang Wen, Bin Sheng, Ping Li, Weiyao Lin, and David Dagan Feng. Deep Color Guided Coarse-to-Fine Convolutional Network Cascade for Depth Image Super-Resolution. IEEE Transactions on Image Processing, 28(2):994-1006, 2019.
Alex Wong, Byung-Woo Hong, and Stefano Soatto. Bilateral Cyclic Constraint and Adaptive Regularization for Unsupervised Monocular Depth Prediction. InIEEE Conference on Computer Vision and Pattern Recognition, 2019.
Ke Xian, Chunhua Shen, Zhiguo Cao, Hao Lu, Yang Xiao, Ruibo Li, and Zhenbo Luo. Monocular Relative Depth Perception With Web Stereo Data Supervision. In IEEE Conference on Computer Vision and Pattern Recognition, 2018.
Ke Xian, Jianming Zhang, Oliver Wang, Long Mai, Zhe Lin, and Zhiguo Cao. Structure-Guided Ranking Loss for Single Image Depth Prediction. In IEEE Conference on Computer Vision and Pattern Recognition, 2020.
Lei Xiao, Anton Kaplanyan, Alexander Fix, Matthew Chapman, and Douglas Lanman. DeepFocus: Learned Image Synthesis for Computational Displays.ACM Transactions on Graphics, 37(6), 2018.
Ning Xu, Brian L. Price, Scott Cohen, and Thomas S. Huang. Deep Image Matting. In IEEE Conference on Computer Vision and Pattern Recognition, 2017.
Yao Yao, Zixin Luo, Shiwei Li, Jingyang Zhang, Yufan Ren, Lei Zhou, Tian Fang, and Long Quan. Blended MVS: A Large-scale Dataset for Generalized Multi-view Stereo Net-works. In IEEE Conference on Computer Vision and Pattern Recognition, 2020.
Wei Yin, Jianming Zhang, Oliver Wang, Simon Niklaus, Long Mai, Simon Chen, and Chunhua Shen. Learning to Recover 3D Scene Shape from a Single Image. In IEEE Conference on Computer Vision and Pattern Recognition, 2021.
Haichao Yu, Ning Xu, Zilong Huang, Yuqian Zhou, and Humphrey Shi. High-resolution deep image matting. In AAAI Conference on Artificial Intelligence, 2021.
Chuanxia Zheng, Tat-Jen Cham, and Jianfei Cai. T2Net: Synthetic-To-Realistic Translation for Solving Single-Image Depth Estimation Tasks. In European Conference on Computer Vision, 2018.
Bolei Zhou, Hang Zhao, Xavier Puig, Sanja Fidler, Adela Barriuso, and Antonio Torralba. Scene Parsing through ADE20K Dataset. In IEEE Conference on Computer Vision and Pattern Recognition, 2017.
Tinghui Zhou, Matthew Brown, Noah Snavely, and David G. Lowe. Unsupervised Learning of Depth and Ego-Motion From Video. In IEEE Conference on Computer Vision and Pattern Recognition, 2017.
Shengjie Zhu, Garrick Brazil, and Xiaoming Liu. The Edge of Depth: Explicit Constraints between Segmentation and Depth. In IEEE Conference on Computer Vision and Pattern Recognition, 2020.
Yunzhi Zhuge, Yu Zeng, and Huchuan Lu. Deep Embedding Features for Salient Object Detection. In AAAI Conference on Artificial Intelligence, 2019.
Yifan Zuo, Qiang Wu, Yuming Fang, Ping An, Liqin Huang, and Zhifeng Chen. Multi-Scale Frequency Reconstruction for Guided Depth Map Super-Resolution via Deep Residual Network. IEEE Transactions on Circuits and Systems for Video Technology, 30(2):297-306, 2020.

* cited by examiner

| Method | Hypersim | | | | | TartanAir | | | | | |
|---|---|---|---|---|---|---|---|---|---|---|---|
| | $R^3\uparrow$ | MBE↓ | $\varepsilon_{acc}\downarrow$ | $\varepsilon_{comp}\downarrow$ | WHDR↓ | RMSE↓ | $R^3\uparrow$ | MBE↓ | $\varepsilon_{acc}\downarrow$ | $\varepsilon_{comp}\downarrow$ | WHDR↓ | RMSE↓ |
| MiDaS v2.1 | - | 0.0973 | 2.521 | 7.074 | 0.1496 | 0.0966 | - | 0.0596 | 3.483 | 6.913 | 0.1207 | 0.0533 |
| + Direct-composite | 3.771 | 0.0941 | 1.915 | 6.233 | 0.1490 | 0.0961 | 5.897 | 0.0594 | 3.183 | 6.363 | 0.1209 | 0.0534 |
| + Direct-paired | - | - | - | - | - | - | 3.507 | 0.0575 | 3.153 | 6.304 | 0.1196 | 0.0525 |
| + Layered-propagation | 1.097 | 0.1044 | 1.942 | 6.284 | 0.1629 | 0.1028 | 3.642 | 0.0608 | 3.128 | 6.358 | 0.1255 | 0.0550 |
| + Layered-DRS | 2.332 | 0.1000 | 1.871 | 6.396 | 0.1560 | 0.0999 | 6.939 | 0.0580 | 3.243 | 6.437 | 0.1230 | 0.0539 |
| + DRS | 5.209 | 0.0906 | 1.888 | 5.931 | 0.1481 | 0.0958 | 16.569 | 0.0579 | 2.851 | 6.272 | 0.1207 | 0.0538 |
| DPT-Large | - | 0.0936 | 2.071 | 6.190 | 0.1347 | 0.0911 | - | 0.0496 | 2.574 | 5.677 | 0.1091 | 0.0414 |
| + Direct-composite | 2.574 | 0.0891 | 1.599 | 5.411 | 0.1339 | 0.0903 | 4.773 | 0.0486 | 2.462 | 5.480 | 0.1086 | 0.0411 |
| + Direct-paired | - | - | - | - | - | - | 2.413 | 0.0485 | 2.519 | 5.394 | 0.1105 | 0.0412 |
| + Layered-propagation | 1.188 | 0.1007 | 1.792 | 5.636 | 0.1502 | 0.0986 | 2.347 | 0.0524 | 2.579 | 5.527 | 0.1162 | 0.0442 |
| + Layered-DRS | 1.996 | 0.0954 | 1.606 | 5.605 | 0.1433 | 0.0953 | 5.626 | 0.0484 | 2.447 | 5.342 | 0.1116 | 0.0423 |
| + DRS | 4.455 | 0.0840 | 1.491 | 5.087 | 0.1333 | 0.0896 | 8.767 | 0.0474 | 2.282 | 5.245 | 0.1078 | 0.0408 |

Fig. 10

| | Hypersim | | | | TartanAir | | | |
|---|---|---|---|---|---|---|---|---|
| | $R^3 \uparrow$ | $MBE \downarrow$ | $\varepsilon_{acc} \downarrow$ | $\varepsilon_{comp} \downarrow$ | $R^3 \uparrow$ | $MBE \downarrow$ | $\varepsilon_{acc} \downarrow$ | $\varepsilon_{comp} \downarrow$ |
| MiDaS v.2.1 | - | 0.0973 | 2.521 | 7.074 | - | 0.0596 | 3.483 | 6.913 |
| + BMF | 0.7784 | 0.0974 | 2.574 | 7.089 | 1.032 | 0.0597 | 3.489 | 6.947 |
| + Mian. | 4.671 | 0.0923 | 1.551 | 5.837 | 4.721 | 0.0602 | 3.605 | 7.287 |
| + DRS | 5.209 | 0.0906 | 1.888 | 5.931 | 16.569 | 0.0579 | 2.851 | 6.272 |
| DPT-Large | - | 0.0936 | 2.071 | 6.190 | - | 0.0496 | 2.574 | 5.677 |
| + BMF | 0.9444 | 0.0937 | 2.094 | 6.203 | 0.6875 | 0.0497 | 2.667 | 5.836 |
| + Mian. | 1.843 | 0.0905 | 1.681 | 5.633 | 4.013 | 0.0496 | 2.414 | 5.569 |
| + DRS | 4.455 | 0.0840 | 1.491 | 5.087 | 8.767 | 0.0474 | 2.282 | 5.245 |

*Fig. 11*

| Stage I | Stage II | HP | $R^3 \uparrow$ | MBE $\downarrow$ | $\varepsilon_{acc} \downarrow$ | $\varepsilon_{comp} \downarrow$ |
|---|---|---|---|---|---|---|
| DPT-Large | | | - | 0.0936 | 2.071 | 6.190 |
| ✓ | | | 1.996 | 0.0954 | 1.606 | 5.605 |
| | ✓ | | 2.016 | 0.0890 | 1.915 | 5.320 |
| | ✓ | ✓ | 2.613 | 0.0861 | 1.670 | 5.161 |
| ✓ | ✓ | | 5.384 | 0.0846 | 1.438 | 5.100 |
| ✓ | ✓ | ✓ | 4.455 | 0.0840 | 1.491 | 5.087 |

Fig. 12

UTILIZING MACHINE LEARNING MODELS TO GENERATE REFINED DEPTH MAPS WITH SEGMENTATION MASK GUIDANCE

BACKGROUND

Recent years have seen significant improvements in hardware and software platforms for digital image processing and editing. For example, conventional systems often use machine learning models to determine image depth estimations from input digital images. To illustrate, conventional systems utilize various models to estimate depth maps that reflect distances within a scene portrayed by pixels of digital images. Conventional systems utilize these depth maps for a variety of downstream image manipulation tasks. Although conventional depth estimation systems can utilize machine learning models to make depth estimations for digital images, such systems have a number of problems in relation to accuracy, efficiency, and flexibility of operation.

BRIEF SUMMARY

Embodiments of the present disclosure provide benefits and/or solve one or more of the foregoing or other problems in the art with systems, non-transitory computer-readable media, and methods for utilizing machine learning models to generate refined depth maps with segmentation mask guidance. For example, the disclosed systems utilize digital segmentation masks to guide a depth refinement machine learning model in refinement of a depth map for a digital image. In some instances, the disclosed systems perform a layered depth refinement, decomposing the depth map into two separate layers signified by the digital segmentation mask and an inverse segmentation mask. Moreover, embodiments of the present disclosure include a self-supervised learning scheme utilizing arbitrary digital segmentation masks and RGB-D datasets (i.e., datasets comprising RGB images with corresponding ground truth depth maps) to train the depth refinement machine learning model.

In one or more implementations, the disclosed systems utilize this self-supervised learning scheme to train and/or implement more accurate, efficient, and flexible machine learning models for depth map refinement. For example, the disclosed systems utilize a pre-trained depth refinement machine learning model to generate a refined depth map for a digital image based on an initial depth map and a digital segmentation mask. Moreover, utilizing machine learning models in this manner, the disclosed systems generate more accurate depth maps that improve a variety of downstream tasks for generating modified digital images (e.g., blurring background elements in a digital image while maintaining sharpness of foreground elements).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 10 illustrates comparative experimental results for the depth refinement systems in accordance with one or more embodiments.

FIG. 11 illustrates comparative experimental results for the depth refinement system in accordance with one or more embodiments.

FIG. 12 illustrates comparative experimental results for the depth refinement systems in accordance with multiple embodiments.

DETAILED DESCRIPTION

Figure 1:
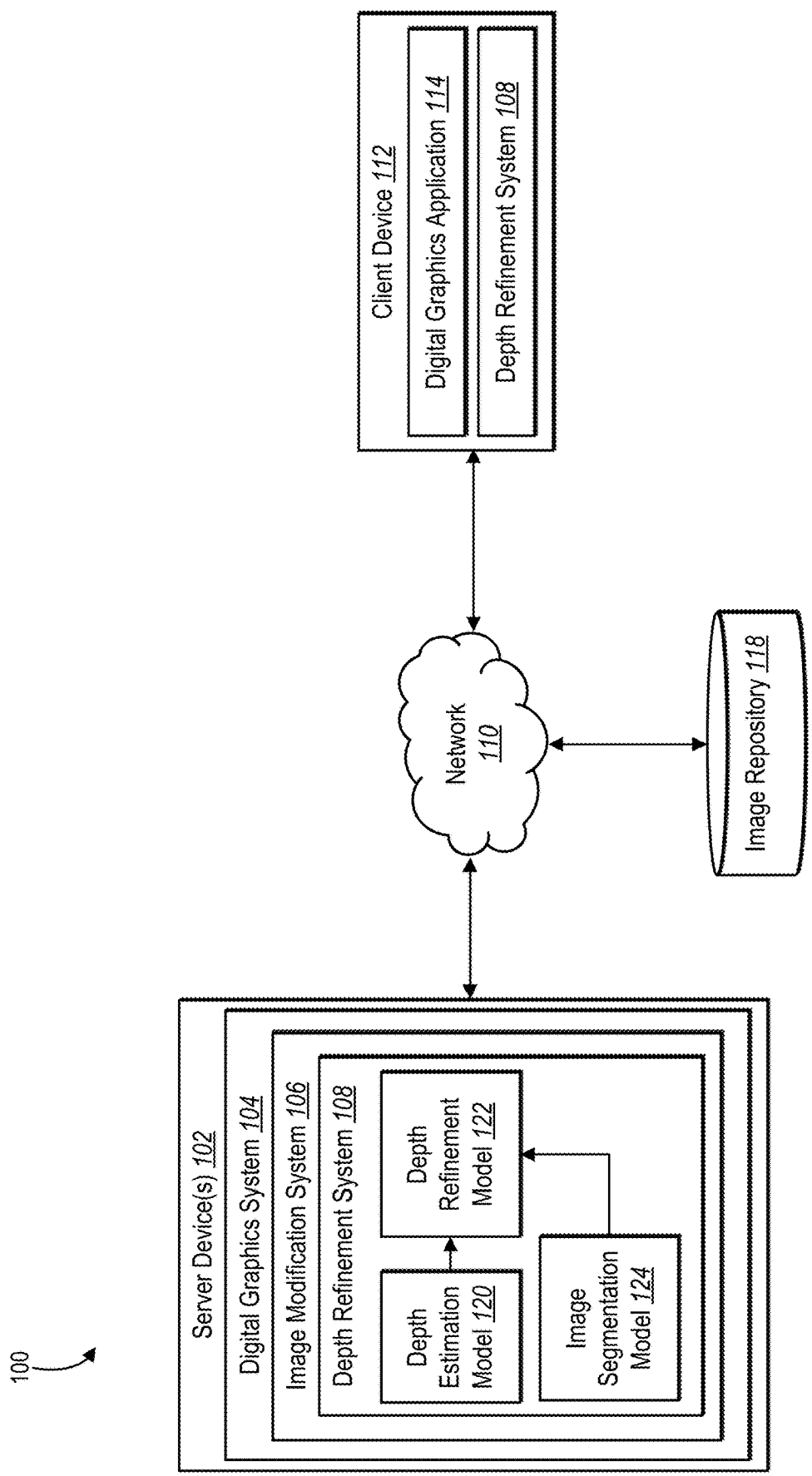
FIG. 1 illustrates a diagram of an environment in which a depth refinement system can operate in accordance with one or more embodiments.

This disclosure describes one or more embodiments of a depth refinement system that utilizes a depth refinement machine learning model to generate refined depth maps for digital images by utilizing segmentation masks for guidance. In particular, in one or more embodiments the depth refinement system utilizes a unique mask-guided depth refinement framework that refines single image depth estimation models guided by a generic high-quality mask. For example, the depth refinement system utilizes a framework for degradation-aware layered depth completion and refinement, which learns to identify and correct inaccurate regions based on the context of the mask and the image. To illustrate, the depth refinement system utilizes a layered refinement strategy, where a mask region and inverse mask region are processed separately to interpolate or extrapolate the depth values beyond the mask boundary, leading to two layers of depth maps. Moreover, some embodiments of the depth refinement system utilize a self-supervised learning scheme that uses RGB-D training data without paired mask annotations.

To further illustrate, in one or more embodiments, the depth refinement system generates a refined depth map from a depth map for a digital image and a digital segmentation mask indicating one or more objects portrayed in the digital image. In particular, the depth refinement system generates an initial depth map utilizing a depth estimation machine learning model. Further, the depth refinement system generates a digital segmentation mask utilizing an image segmentation machine learning model. The depth refinement system then utilizes a depth estimation machine learning model to generate a refined depth map from the initial depth map and the digital segmentation mask.

In particular, in one or more embodiments, the depth refinement system utilizes a layered refinement approach to generate a refined depth map. Specifically, the depth refinement system utilizes the depth estimation machine learning model to generate a first intermediate depth map based on a digital segmentation mask. The depth refinement system also utilizes the depth estimation machine learning model to generate a second intermediate depth map based on an inverse digital segmentation mask (e.g., an inverse of the digital segmentation mask). Moreover, the depth refinement system generates a refined depth map by merging the first and second intermediate depth maps to generate the refined depth map. Further, in some embodiments, the depth refinement system utilizes a plurality of digital segmentation masks indicating a plurality of objects portrayed in a digital image at various depths to generate a refined depth map for the digital image.

As mentioned above, in one or more embodiments, the depth refinement system utilizes a unique self-supervised approach to train the depth estimation machine learning model. For example, the depth refinement system generates a training dataset of composite digital images and composite depth maps from an RGB-D dataset (i.e., a dataset comprising multiple digital images with corresponding depth maps) and one or more arbitrary masks. In particular, the depth refinement system extracts an image excerpt from a first digital image based on an arbitrary mask (i.e., a segmentation mask indicating an arbitrary object unrelated to the first digital image). In addition, the depth refinement system combines the image excerpt with a second digital image to generate a composite digital image. Similarly, in some embodiments, the depth refinement system generates a composite depth map. Specifically, the depth refinement system extracts a depth map excerpt from a first depth map corresponding to the first digital image (based on the same arbitrary mask). Moreover, the depth refinement system combines the depth map excerpt with a second depth map for the second digital image.

Furthermore, in one or more embodiments the depth refinement system trains a depth refinement machine learning model to generate refined depth maps using the aforementioned training dataset. In particular, the depth refinement system utilizes the composite digital images and corresponding composite depth maps as ground truth depth maps to train the model. Additionally, in some embodiments, the depth refinement system perturbs a composite depth map to emulate one or more anticipated inaccuracies of initial depth estimation. The depth refinement system utilizes the perturbed composite depth map to train the depth refinement machine learning model correct depth map inaccuracies.

In one or more embodiments, the depth refinement system utilizes a two-stage training approach to learn parameters of the depth refinement machine learning model. Specifically, in a first stage, the depth refinement system trains the depth refinement machine learning model for image completion. In particular, the depth refinement system iteratively trains the depth refinement machine learning model for inpainting and outpainting depth to complete different masked regions of input digital images. In the second stage, the depth refinement system adds perturbations and generates two intermediate depth maps and a refined depth map utilizing the depth refinement machine learning model. The depth refinement system modifies parameters of the depth refinement machine learning model by based on losses measured from the intermediate depth maps and the refined depth map. In this manner, the depth refinement system learns parameters of a depth refinement machine learning model that generates accurate depth maps utilizing digital image segmentations.

As mentioned above, conventional systems suffer from a number of technical deficiencies with regard to accuracy, efficiency, and flexibility of implementing computing devices. For example, conventional single image depth estimation systems often fail to generate accurate depth maps. To illustrate, conventional systems often utilize complex deep learning architectures to generate depth maps from digital images utilizing various loss functions. Some conventional systems have also utilized various approaches to refine depth maps, such as depth map super-resolution or depth completion. However, these approaches tend to generate depth maps with a variety of artifacts and inaccuracies. Specifically, depth boundaries tend to be blurry and inaccurate, thin structures such as poles and wires are often missing, and depth values in narrow or isolated background regions (e.g., between body parts in humans) are often imprecise.

In addition, conventional systems are also inflexible. For example, conventional systems are often rigid in that they are tied to a particular model architecture and approach. Thus, for example, conventional systems cannot operate with other models or incorporate improvements from other models as they progress.

Furthermore, conventional systems are often inefficient. To illustrate, conventional systems often suffer from limited model capacity due to the lack of high-quality training datasets. Indeed, even with sophisticated framework designs of conventional systems, capturing accurate depth boundaries remains a challenge due to the lack of pixel-perfect ground truth depth data. Accordingly, conventional systems require extensive time and computational resources in generating or gathering training data and then utilizing training data to modify model parameters.

Moreover, because of the inaccuracies discussed above, conventional systems also suffer from inefficiencies in a variety of downstream tasks that utilize depth maps. Indeed, conventional systems require significant time and computing resources to correct depth maps and/or correct errors from utilizing inaccurate depth maps. To illustrate, due to conventional systems' inaccurate estimations on depth, client devices employing background blurring tools in an image editing application typically need to apply additional touch up features to compensate for the inefficiencies of conventional systems. Specifically, client devices may need to employ a variety of tools such as new layers, erasers, or setting adjustments to accurately fix the initial depth estimations made by conventional systems. Client devices also often request duplicate implementation of artificial intelligence models to re-estimate depth of a digital image in response to inaccurate estimations. This further contributes to additional computational processing burdens and inefficiencies.

The depth refinement system provides many advantages and benefits over conventional systems and methods. For example, by utilizing digital segmentation masks to guide refinement of depth maps, the depth refinement system generates refined depth maps with improved accuracy relative to conventional systems. Specifically, in one or more implementations, the depth refinement system generates refined depth maps having improved accuracy and higher resolution along borders and near objects indicated by digital segmentation masks utilized by the depth refinement machine learning model as disclosed herein.

The depth refinement system also improves flexibility relative to conventional systems. Indeed, the depth refinement system is flexible in that it can refine depth maps generated by any variety of single image depth estimation models regardless of the model architecture. Thus, the depth refinement system can be deployed with a variety of different models or model architectures and flexibly incorporate improvements from other depth estimation models as they develop. Furthermore, the disclosed systems and methods can be implemented to generate a variety of environment maps (i.e., graphical representations of environmental data) for digital images, such as, for example, heat (i.e., infrared) maps, height maps, normal maps, elevation maps, contrast maps, semantic segmentation maps, optical flow maps, and so forth.

Furthermore, the depth refinement system exhibits increased efficiency relative to conventional systems and methods. As an initial matter, the depth refinement system utilizes a self-supervised training approach that efficiently generates training data for accurately tuning a depth refinement machine learning model. Indeed, as discussed in greater detail below, the depth refinement system can generate composite training images and corresponding depth maps to efficiently and accurately modify parameters of a depth refinement machine learning model. Thus, in one or more implementations the depth refinement system significantly reduces time and computing resources needed to train a depth refinement machine learning model.

In addition, because one or more implementations of the depth refinement system improve accuracy of depth prediction machine learning models, the log depth estimation also generates improved depth maps and improves efficiency of downstream tasks that utilize depth maps. For example, the depth refinement system can reduce time and resources utilized by conventional systems to correct depth maps or correct artifacts in digital images generated utilizing inaccurate depth maps.

Additional detail will now be provided in relation to illustrative figures portraying example embodiments and implementations of a depth refinement system. For example, FIG. 1 illustrates a system 100 (or environment) in which a depth refinement system 108 operates in accordance with one or more embodiments. As illustrated the system 100 includes server device(s) 102, a network 110, a client device 112, and an image repository 118. As further illustrated, the server device(s) 102, the client device 112, and the image repository 118 communicate with one another via the network 110.

As shown in FIG. 1, the server device(s) 102 include a digital graphics system 104 that further includes an image modification system 106, which itself further includes the depth refinement system 108. In one or more embodiments, the depth refinement system 108 generates a depth map utilizing a depth estimation model 120, then generates a refined version of the depth map (i.e., a refined depth map) utilizing depth refinement model 122 and an image segmentation model 124 (as further described below). In some embodiments, the server device(s) include, but is not limited to, a computing device (such as explained below in reference to FIG. 12).

Furthermore, as shown in FIG. 1, the system 100 includes the client device 112. In some embodiments, the client device 112 includes, but is not limited to, a mobile device (e.g., smartphone, tablet), a laptop computer, a desktop computer, or any other type of computing device, including those explained below in reference to FIG. 15. Although not shown in FIG. 1, some embodiments of client device 112 are operated by a user to perform a variety of functions via a digital graphics application 114 on client device 112. For example, the digital graphics application 114 includes one or more software applications (e.g., to interact with and/or modify digital images and/or three-dimensional models utilizing refined depth maps generated in accordance with one or more embodiments herein) installed on the client device 112. In certain instances, the digital graphics application 114 are hosted on the server device(s) 102. Additionally, when hosted on the server device(s) 102, the digital graphics application 114 are accessed by the client device 112 through a web browser and/or another online interfacing platform and/or tool.

Although FIG. 1 illustrates the depth refinement system 108 being implemented by a particular component and/or device within the system 100 (e.g., the server device(s) 102), in some embodiments the depth refinement system 108 is implemented, in whole or in part, by other computing devices and/or components in the system 100. For instance, in some embodiments, the depth refinement system 108 is implemented on the client device 112 (e.g., via the image digital graphics application 114). More specifically, in one or more embodiments, the description of (and acts performed by) the depth refinement system 108 with regard to the server device(s) 102 are implemented (or performed by) the depth refinement system 108 on the client device 112. In particular, in some embodiments, the client device 112 (via an implementation of the depth refinement system 108) generates a refined depth map utilizing the depth refinement model 122.

In some embodiments, the server device(s) 102 trains one or more machine learning models described herein. The depth refinement system 108 on the server device(s) 102 provides the one or more trained machine learning models to the client device 112 for implementation. In other words, the client device 112 obtains (e.g., downloads) the machine learning models from the server device(s) 102. At this point, the client device 112 may utilize the machine learning models to generate refined depth maps for digital images.

In some embodiments, the digital graphics application 114 includes a web hosting application that allows the client device 112 to interact with content and services hosted on the server device(s) 102. To illustrate, in one or more implementations, the client device 112 accesses a web page or computing application supported by the server device(s) 102. The client device 112 provides input to the server device(s) 102 (e.g., a digital image and/or a depth map). In response, the depth refinement system 108 on the server device(s) 102 performs operations described herein to generate a refined depth map. The server device(s) 102 then provides the output or results of the operations (e.g., a refined depth map for a digital image) to the client device 112.

As further shown in FIG. 1, the system 100 includes the image repository 118. In one or more embodiments, the image repository 118 includes, but is not limited to, a server device, a cloud service computing device, or any other type of computing device (including those explained below in reference to FIG. 15) that stores one or more digital images, and, in some embodiments, additional data associated with the one or more digital images, such as corresponding depth maps. For example, the depth refinement system 108 utilizes images from the image repository 118 to generate refined depth maps for those images. In some instances, an initial depth map (such as those generated by depth estimation model 120) is provided by the image repository 118 to the depth refinement system 108 for refinement by the depth refinement model 122. In some instances, the depth refinement system 108 performs the above-mentioned tasks upon receiving a request from the client device 112 to utilize digital images (and in some implementations, corresponding depth maps) from the image repository 118.

Additionally, as shown in FIG. 1, the system 100 includes the network 110. As mentioned above, in some instances, the network 110 enables communication between components of the system 100. In certain embodiments, the network 110 includes a suitable network and may communicate using any communication platforms and technologies suitable for transporting data and/or communication signals, examples of which are described with reference to FIG. 15. Furthermore, although FIG. 1 illustrates the server device(s) 102, the client device 112, and the image repository 118 communicating via the network 110, in certain embodiments, the various components of the system 100 communicate and/or interact via other methods (e.g., the server device(s) 102 and the client device 112 communicating directly).

As discussed above, in one or more embodiments, the depth refinement system 108 generates a refined depth map from a digital image, a depth map, and a digital segmentation mask utilizing a depth refinement machine learning model. For instance, FIG. 2 illustrates the depth refinement system 108 generating a refined depth map 210 in accordance with one or more embodiments.

Figure 2:
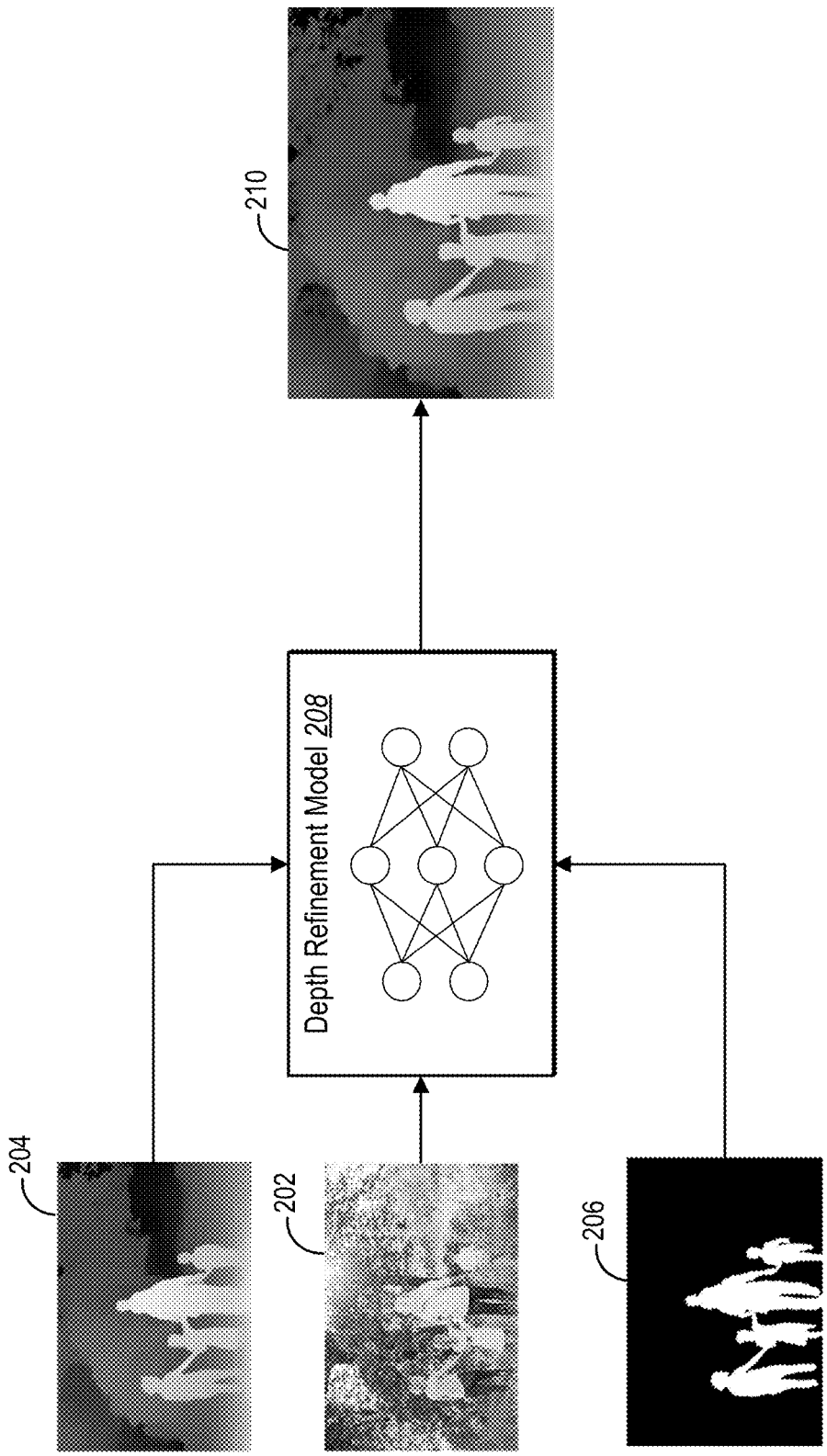
FIG. 2 illustrates an overview of a depth refinement system generating a refined depth map in accordance with one or more embodiments.

In particular, as shown in FIG. 2, the depth refinement system 108 identifies or receives a digital image 202 depicting objects at various depths. For example, the depth refinement system 108 captures a digital image (e.g., utilizing a camera device of a client device) and/or accesses a repository of digital images (e.g., a camera roll or cloud storage of digital images).

Moreover, the depth refinement system 108 identifies, receives, or generates a depth map 204 for the digital image 202. For example, a depth map refers to a digital representation of distances portrayed in a digital image. In particular, a depth map includes an array, matrix, image, or other representation that includes values representing distances corresponding to pixels representing objects in a digital image.

For example, in one or more embodiments the depth refinement system 108 utilizes a depth estimation model (e.g., the depth estimation model 120) to generate the depth map 204. As mentioned above, the depth refinement system can operate with a variety of environmental maps (e.g., in addition to depth maps). Thus, for example, the depth refinement system can also identify or generate an environment map of the digital image 202.

In addition, the depth refinement system 108 identifies, receives, or generates a digital segmentation mask 206 for the digital image 202. In particular, the digital segmentation mask 206 indicates the boundaries of one or more of the objects depicted in the digital image 202. For example, the depth refinement system 108 utilizes an image segmentation model (e.g., the image segmentation model 124) to generate the digital segmentation mask 206.

Moreover, as shown in FIG. 2, the depth refinement system 108 generates the refined depth map 210 from the depth map 204 and the digital segmentation mask 206 utilizing a depth refinement machine learning model 208. Indeed, as illustrated in FIG. 2, the depth refinement system 108 generates a refined depth map 210 exhibiting greater accuracy (e.g., improved resolution of details near holes and boundaries indicated by the digital segmentation mask 206) relative to the depth map 204 initially received for or generated from the digital image 202.

The depth refinement system 108 can utilize a variety of machine learning models (e.g., for the depth refinement machine learning model 208, the depth estimation model 120, and/or the image segmentation model 124). For example, a machine learning model includes a computer-implemented model trained and/or tuned based on inputs to approximate unknown functions. To illustrate, in one or more embodiments a machine learning model includes a computer algorithm with branches, weights, or parameters that are changed/learned based on training data to improve for a particular task. Thus, in one or more implementations a machine learning model utilizes one or more machine learning techniques (e.g., supervised or unsupervised learning) to improve in accuracy and/or effectiveness. Example machine learning models include various types of decision trees, support vector machines, Bayesian networks, logistic regressions, random forest models, or neural networks (e.g., deep neural networks).

In one or more implementations, the depth refinement machine learning model 208, the depth estimation model 120, and/or the image segmentation model 124 are implemented as neural networks. In particular, in some embodiments, a neural network includes a model of interconnected artificial neurons (e.g., organized in layers) that communicate and learn to approximate complex functions and generate outputs based on a plurality of inputs provided to the model. In some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Accordingly, the depth refinement system 108 inputs data of the digital image 202, the depth map 204, and the digital segmentation mask 206 to input channels of the depth refinement neural network. The depth refinement neural network then utilizes learned parameters within various layers to generate the refined depth map 210.

Figure 3:
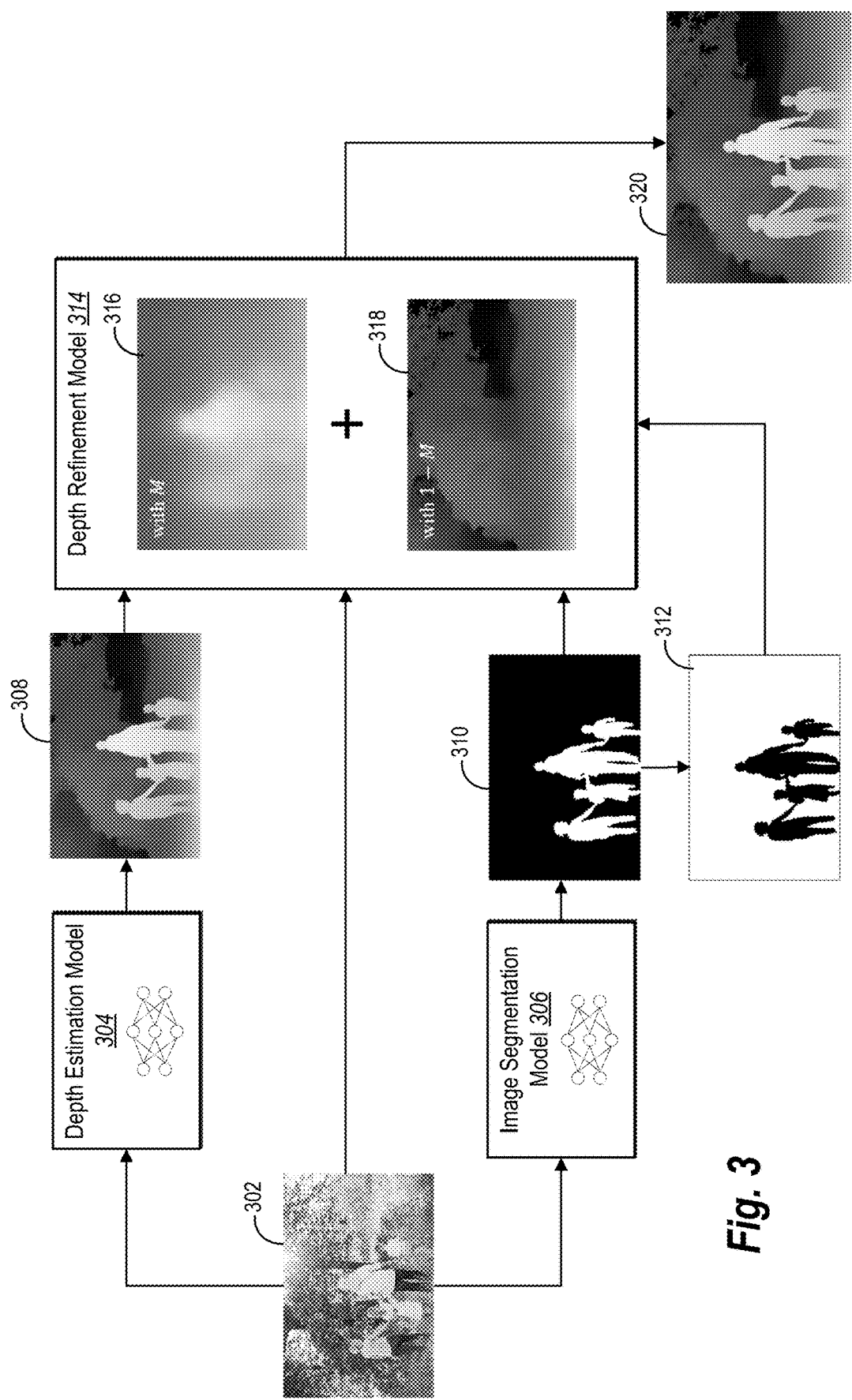
FIG. 3 illustrates a depth refinement system generating an initial depth map, a digital segmentation mask, and a refined depth map in accordance with one or more embodiments.

As mentioned above, in one or more embodiments, the depth refinement system 108 utilizes one or more machine learning models to generate a refined depth map for a digital image. For example, FIG. 3 illustrates an overview of the depth refinement system 108 utilizing a depth estimation machine learning model 304 to generate a depth map 308 for a digital image 302, an image segmentation machine learning model 306 to generate a digital segmentation mask 310 for the digital image 302, and a depth refinement machine learning model 314 to generate a refined depth map 320 from the depth map 308 and the digital segmentation mask 310.

For example, as illustrated, the depth refinement system 108 utilizes a depth estimation model 304 to generate a depth map 308. As mentioned above, the depth estimation model 304 can include a variety of models (e.g., machine learning models) for generating a depth map. For instance, in some embodiments, the depth estimation model 304 includes a monocular depth estimation model. To illustrate, the depth estimation model 304 can include a single image depth estimation model (SIDE) with a convolutional neural network architecture. Similarly, the depth estimation model 304 can utilize a transformer model and/or leverage self-attention layers to generate a depth map. For example, in one or more embodiments, the depth refinement system 108 utilizes a depth estimation model as described in Generating Depth Images Utilizing A Machine-Learning Model Built From Mixed Digital Image Sources And Multiple Loss Function Sets, U.S. patent application Ser. No. 17/186,436, filed Feb. 26, 2021. Thus, the depth refinement system 108 utilizes the depth estimation model 304 to process the digital image 302 and generate the depth map 308.

Moreover, as shown, the depth refinement system 108 also utilizes an image segmentation model 306 to generate a digital segmentation mask 310 and/or an inverse digital segmentation mask 312. As mentioned above, the image segmentation model 306 can include a variety of machine learning models. For example, the image segmentation model 306 can include a convolutional neural network trained to segment digital objects from digital images. In one or more embodiments, the depth refinement system 108 utilizes an image segmentation model as described in Deep Salient Content Neural Networks for Efficient Digital Object Segmentation, U.S. Patent Application Publication No. 2019/0130229, filed Oct. 31, 2017.

As shown, the depth refinement system 108 utilizes the image segmentation model 306 to generate a digital segmentation mask 310 and the inverse digital segmentation mask 312. For example, the depth refinement system 108 utilizes the image segmentation model 306 to generate the digital segmentation mask 310. Moreover, the depth refinement system 108 inverts the digital segmentation mask 310 to generate the inverse digital segmentation mask 312. For example, in one or more embodiments, the depth refinement system 108 generates the inverse digital segmentation mask 312 by replacing 1s with 0s (or 0s with 1s) in the digital segmentation mask 310.

As discussed, some embodiments of the depth refinement system 108 implement a layered approach to generate refined depth maps for digital images. For example, as shown in FIG. 3, the depth refinement system 108 generates a first intermediate depth map 316. In particular, the depth refinement system 108 generates the first intermediate depth map 316 utilizing the depth refinement model 314 from the initial depth estimation 308 and the digital segmentation mask 310. Indeed, by processing the initial depth estimation 308 and the digital segmentation mask 310 utilizing the depth refinement model 314, the depth refinement system 108 accurately clarifies or refines one or more regions or boundaries within the initial depth map 308 as informed by the digital segmentation mask 310.

Additionally, as shown in FIG. 3, the depth refinement system 108 generates a second intermediate depth map 318. In particular, the depth refinement system 108 generates the second intermediate depth map 318 utilizing the depth refinement model from the initial depth estimation 308 and the inverse digital segmentation mask 312. Accordingly, the second intermediate depth map 318 clarifies or refines regions or boundaries within the initial depth map 308, as informed by an inverse digital segmentation mask 312 (i.e., the inverse of the digital segmentation mask 310).

Moreover, the depth refinement system 108 blends, merges, or otherwise combines the first intermediate depth map 316 and the second intermediate depth map 318 to generate the refined depth map 320. The depth refinement system 108 can combine the first intermediate depth map 316 and the second intermediate depth map 318 in a variety of ways. For example, in some embodiments, the depth refinement system 108 applies the digital segmentation mask 310 to the first intermediate depth map (e.g., to generate a first segmented intermediate depth map). Moreover, the depth refinement system 108 applies the inverse digital segmentation mask 312 to the second intermediate depth map (e.g., to generate a second segmented intermediate depth map). The depth refinement system 108 then overlays the first segmented intermediate depth map with the second segmented intermediate depth map.

The depth refinement system 108 can combine the first intermediate depth map 316 and the second intermediate depth map 318 utilizing other approaches. For example, the depth refinement system 108 can average pixel values from the first intermediate depth map 316 and the second intermediate depth map 318. Similarly, the depth refinement system 108 can apply the digital segmentation mask 310 to the first intermediate depth map (to generate a first segmented intermediate depth map) and overlay the first segmented intermediate depth map on the second intermediate depth map (or vice versa). Thus, the depth refinement system 108 generates a refined depth map 320 that more accurately and crisply reflects depths of objects portrayed in the digital image 302.

Although not illustrated in FIG. 3, in one or more implementations the depth refinement system 108 also utilizes the refined depth map 320 for additional downstream tasks. For example, the depth refinement system 108 can utilize the refined depth map to generate a modified digital image (e.g., from the digital image 302). In particular, the depth refinement system 108 can utilize the refined depth map for neural filters, depth blur filters, landscape mixer filters, content-aware fill models, lens blur, and novel view synthesis.

Alternatively, although FIG. 3 illustrates a depth refinement system 108 for generating refined depth maps for digital images, the disclosed systems and methods can be implemented to generate a variety of refined environment maps, such as but not limited to a refined normal map, refined inverse depth map, a refined semantic segmentation map, a refined optical flow map, a refined image contrast map, or a refined infrared map. Accordingly, the depth refinement system 108 can generate first and second intermediate environment maps utilizing a map refinement machine learning model utilizing a digital segmentation mask as guidance for refining an initial environment map. Further, the map refinement system can merge the first and second intermediate environment maps to determine a refined environment map for the digital image. Moreover, each of the methods described below (e.g., methods for training a depth refinement machine learning model) can be implemented to train and execute a map refinement machine learning model to generate refined environment maps of various data types.

As mentioned above, in one or more implementations the depth refinement system 108 utilizes training data comprised of composite digital images and composite depth maps to train a depth refinement machine learning model. For example, FIG. 4 illustrates the depth refinement system 108 generating a composite digital image and a composited depth map for training a depth refinement machine learning model to generate refined depth maps in accordance with one or more embodiments.

Figure 4:
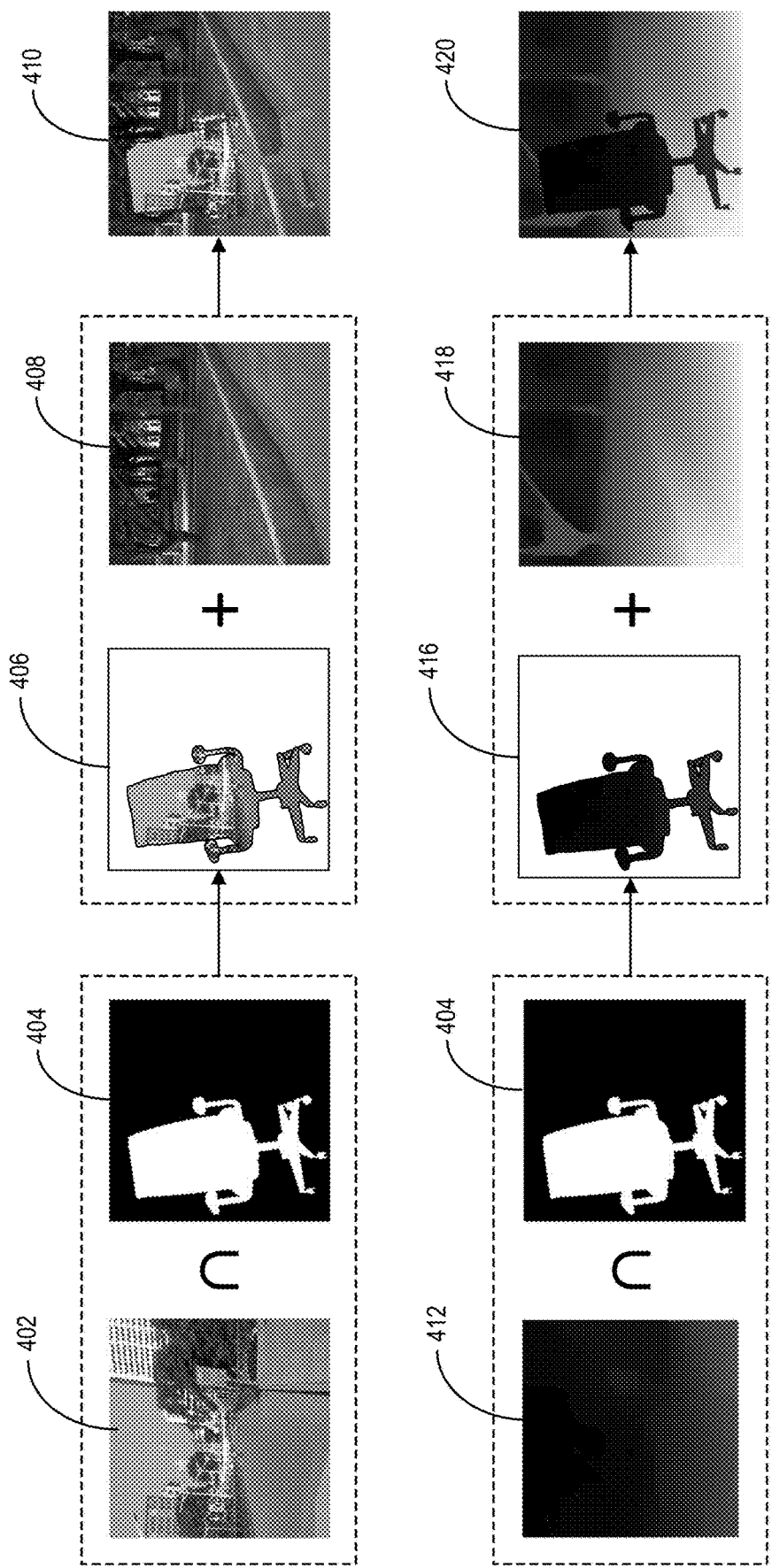
FIG. 4 illustrates a depth refinement system generating a composite digital image and a composite ground truth depth map in accordance with one or more embodiments.

As illustrated in FIG. 4, the depth refinement system 108 identifies a first digital image 402 and a second digital image 408 (e.g., from a repository of training digital images). Moreover, the depth refinement system identifies an arbitrary mask 404. For example, the arbitrary mask 404 need not correspond to any digital object portrayed in the first digital image 402 and the second digital image 408. Indeed, as shown, the arbitrary mask 404 corresponds to a chair, even though the first digital image 402 and the second digital image 408 do not portray a chair.

Moreover, the depth refinement system 108 utilizes the first digital image 402, the second digital image 408, and the arbitrary mask 404 to generate a composite digital image 410. Specifically, the depth refinement system 108 generates the composite digital image 410 from the first digital image 402 and the second digital image 408 using the arbitrary mask 404 as an intersection template. As shown in FIG. 4, the depth refinement system 108 creates an image excerpt 406 from the first digital image 402 by intersecting the arbitrary mask 404 with the first digital image 402. Moreover, the depth refinement system 108 combines (i.e., overlays) the image excerpt 406 with the second digital image 408 (or an inverse excerpt from the digital image 408) to generate the composite digital image 410.

In addition, as shown in FIG. 4, the depth refinement system 108 also identifies a first depth map 412 corresponding to the first digital image 402 and a second depth map 418 corresponding to the second digital image 402. For example, the depth refinement system 108 can identify the first depth map 412 and the second depth map 418 from a repository of ground truth training depth maps corresponding to the training digital images. In some embodiments, the depth refinement system generates the first depth map 412 and the second depth map 418 (e.g., utilizing a depth map model or segmentation via user interactions with a computing device).

Similarly, as shown in FIG. 4, the depth refinement system 108 utilizes the first depth map 412, the second depth map 418, and the arbitrary mask 404 to generate a composite depth map 420. In particular, the depth refinement system 108 generates the composite depth map 420 from the first depth map 412 of the first digital image 402 and the second depth map 418 of the second digital image 408 utilizing the arbitrary mask 404 (i.e., the same mask used to generate the composite digital image 410) as an intersection template. Accordingly, the depth refinement system 108 creates a depth map excerpt 416 from the first depth map 412, then combines (i.e., overlays) the depth map excerpt 416 with the second depth map 418 (or an inverse excerpt from the depth map 418) to generate the composite depth map 420.

To further illustrate, the depth refinement system 108 can synthesize a composite image I' by the equation $I'=M \cdot I_1 + (1-M) \cdot I_2$, where M represents an arbitrary digital segmentation mask, and where $I_1$ and $I_2$ represent first and second digital images corresponding to given depth maps $D_1$ and $D_2$, respectively. Similarly, the depth refinement system 108 can synthesize a corresponding composite depth map D' from the same arbitrary digital segmentation mask M and the given depth maps $D_1$ and $D_2$ by the equation $D'=M \cdot D_1 + (1-M) \cdot D_2$.

As mentioned previously, in some embodiments, the depth refinement system 108 generates training data for self-supervised training of a depth refinement model from an RGB-D dataset. For instance, with reference to FIG. 4, the depth refinement system 108 accesses the first digital image 402 with corresponding first depth map 412 and the second digital image 408 with corresponding second depth map 418 from an RGB-D dataset comprising multiple digital images with corresponding depth maps (e.g., depth maps produced by one or more sensors when capturing each respective digital image).

As discussed in further detail below, by combining digital images with corresponding depth maps to generate composite digital images and corresponding composite depth maps, the depth refinement system 108 can conduct self-supervised training of a depth refinement machine learning model to predict refined depth maps utilizing the layered approach according to one or more embodiments disclosed herein. For example, as also described in further detail below, the depth refinement system 108 can utilize respective first, second, and composite depth maps as first and second ground truth depth maps in automated training of the model to generated refined depth maps.

Figure 5:
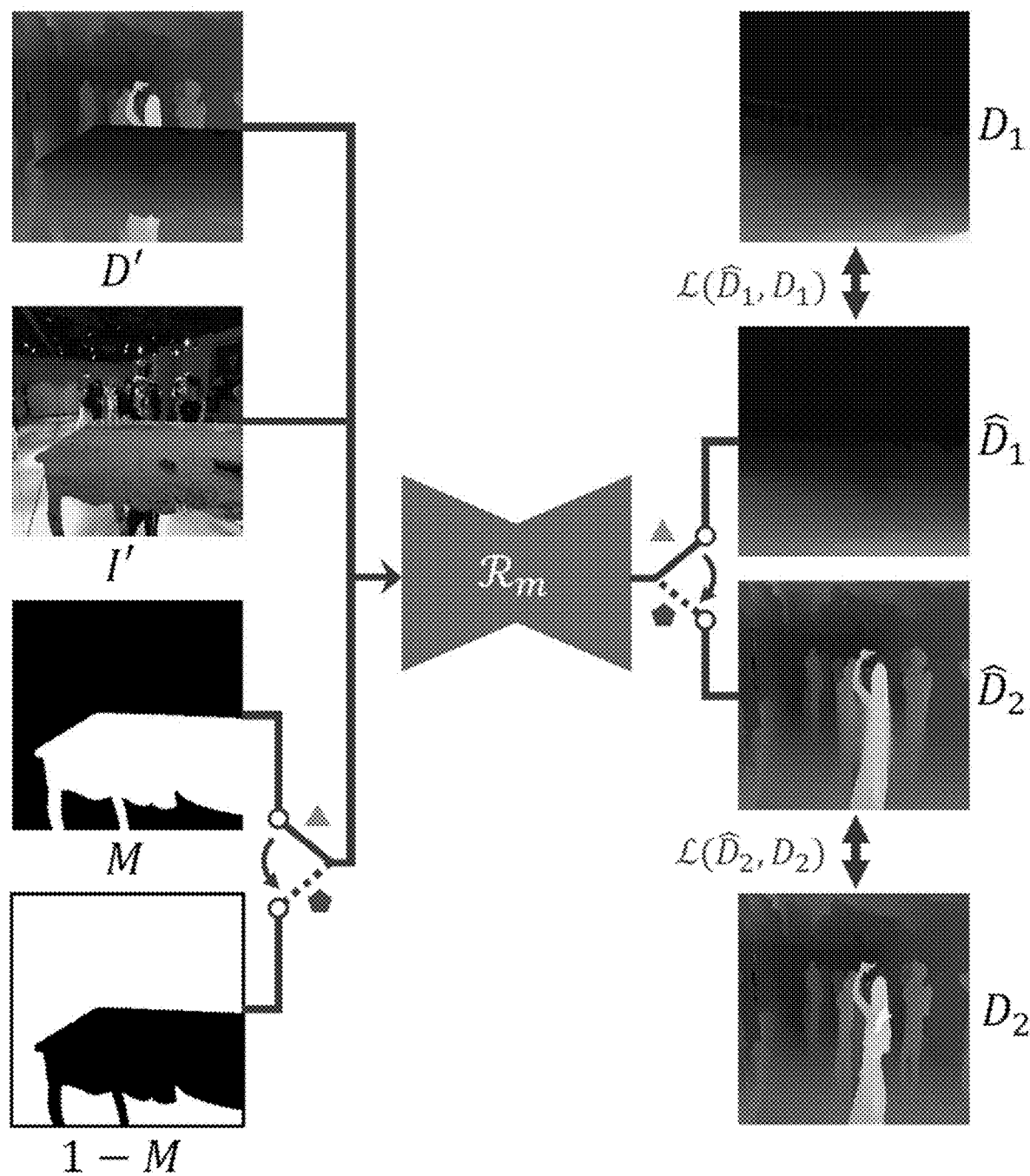
FIG. 5 illustrates a depth refinement system training a depth refinement machine learning model utilizing composite digital images in accordance with one or more embodiments.
Figure 6:
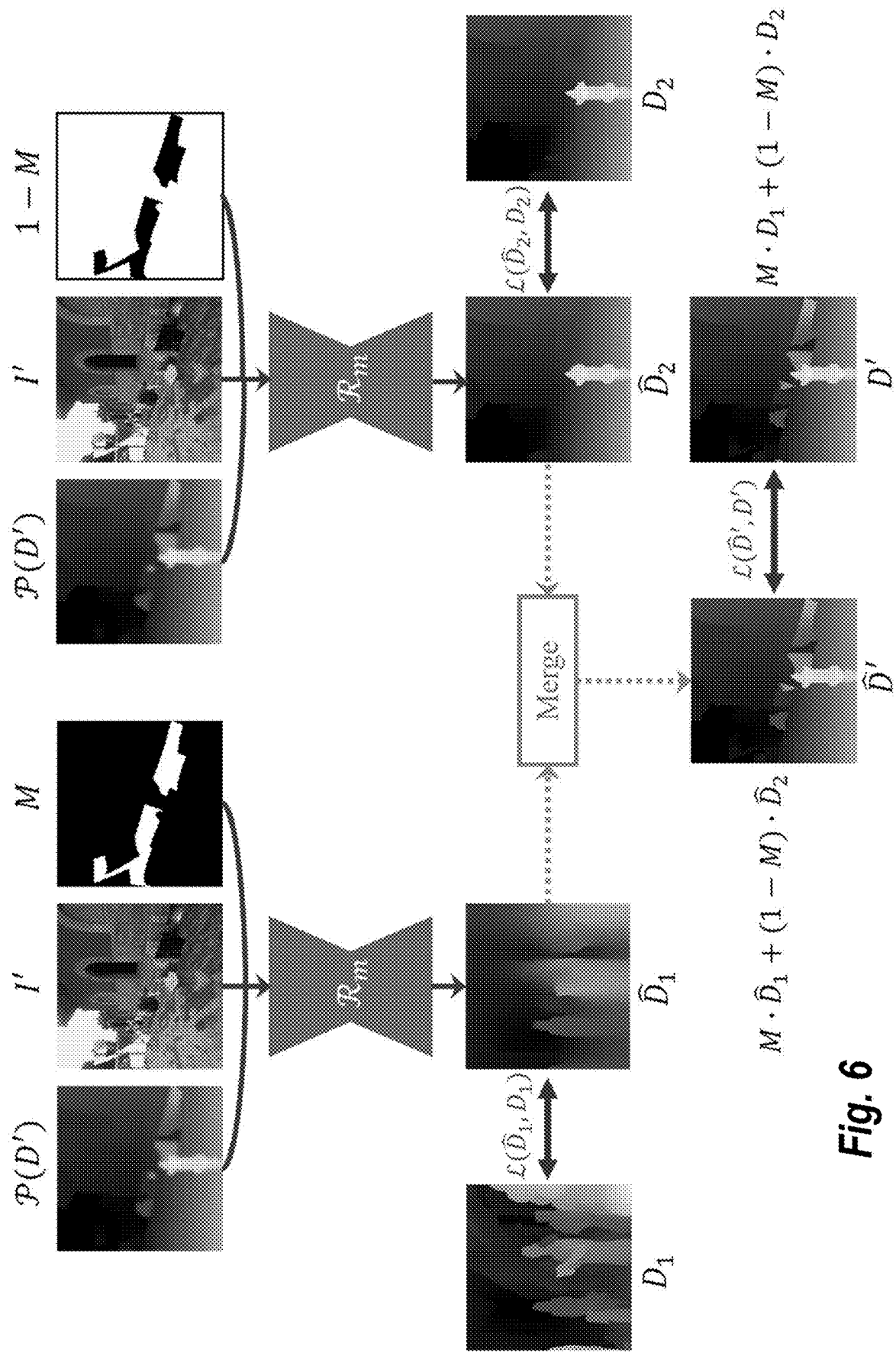
FIG. 6 illustrates a depth refinement system training a depth refinement machine learning model utilizing perturbed depth maps in accordance with one or more embodiments.

As mentioned above, in one or more embodiments, the depth refinement system 108 trains a depth refinement machine learning model using composite digital images and corresponding composite depth maps (e.g., the composite digital image 410 and the composite depth map 420). For example, the depth refinement system 108 utilizes a two stage approach to a depth refinement machine learning model. Specifically, the depth refinement system 108 utilizes a first training stage to train a depth refinement machine learning model to complete (e.g., in paint) depth map regions covered by digital segmentation maps. Moreover, the depth refinement system 108 utilizes a second training stage to train a depth refinement machine learning model to more accurately generate depth maps utilizing perturbed training depth maps. FIG. 5 illustrates a first training stage and FIG. 6 illustrates a second training stage in accordance with one or more embodiments.

For instance, FIG. 5 illustrates the depth refinement system 108 training a depth refinement model $\mathcal{R}_m$ for intermediate depth map completion.

More specifically, as shown in FIG. 5, the depth refinement system 108 identifies (or receives) training data (e.g., as just described with regard to FIG. 4). For example, as illustrated, the depth refinement system 108 identifies (or receives) a composite digital image I' (e.g., the composite digital image 410 described above). Moreover, the depth refinement system 108 identifies the corresponding composite depth map D' (e.g., the composite depth map 420 described above), the digital segmentation mask M used to generate composite digital image I' and composite depth map D' (e.g., the arbitrary mask 404 described above) and/or the inverse mask 1-M of digital segmentation mask M.

As described in greater detail above in relation to FIG. 4, the composite digital image I' comprises an image excerpt of a first digital image $I_1$ (e.g., the digital image 402 determined based on the digital segmentation mask M then overlaid onto a second digital image $I_2$ (e.g., the digital image 408). Relatedly, the composite depth map D' comprises a depth map excerpt of a first ground truth depth map $D_1$ (e.g., the depth map 412) for the first digital image $I_1$ determined based on the same digital segmentation mask M then overlaid onto a second ground truth depth map $D_2$ (e.g., the depth map 418) for the second digital image $I_2$.

By generating composite digital images and composite depth maps in the manner described above, the digital segmentation mask M indicates the portion of the composite depth map D' corresponding to the first digital image $I_1$ and the first ground truth depth map $D_1$. Moreover, the inverse digital segmentation mask 1-M indicates the portion of the composite depth map D' corresponding to the second digital image $I_2$ and second ground truth depth map $I_2$. Consequently, as illustrated in FIG. 5, the depth refinement system 108 trains the depth refinement model $\mathcal{R}_m$ to complete (i.e., generate) a first intermediate depth map $\hat{D}_1$ corresponding to the first ground truth depth map $D_1$ when using the digital segmentation mask M as guidance for processing (i.e., refining) the composite depth map D'. Conversely, the depth refinement system 108 trains the depth refinement model $\mathcal{R}_m$ to complete (i.e., generate) a second intermediate depth map $D_2$ corresponding to the second ground truth depth map $D_2$ when using the inverse digital segmentation mask 1-M as guidance for processing (i.e., refining) the composite depth map D'.

Accordingly, as shown in FIG. 5, the depth refinement system 108 utilizes the depth refinement model $\mathcal{R}_m$ to generate a first predicted depth map $\hat{D}_1$. Specifically, the depth refinement system 108 generates first predicted depth map $\hat{D}_1$ from the composite digital image I', the composite depth map D', and the digital segmentation mask M. Thus, in one or more embodiments, the depth refinement system 108 utilizes the following formulation to generate the intermediate depth map $\hat{D}_1$: $\hat{D}_1 = \mathcal{R}_m(D', I', M)$.

As mentioned above, the depth refinement system 108 generates the composite digital image I' to include a portion of the first digital image $I_1$ remaining after applying the digital segmentation mask M. Similarly, the depth refinement system 108 generates the composite depth map D' to include a portion of the first ground truth depth map $D_1$ remaining after applying the digital segmentation mask M. Moreover, the depth refinement system 108 generates $\hat{D}_1$ from the portion of the composite digital image I' remaining after applying the digital segmentation mask M. Thus, $\hat{D}_1$ reflects a predicted depth map corresponding to the first digital image $I_1$ and the first ground truth depth map $D_1$. Thus, the difference between the predicted depth map $\hat{D}_1$ and the ground truth depth map $D_1$ reflects a measure of error or inaccuracy of the depth refinement model $\mathcal{R}_m$.

Accordingly, as shown, the depth refinement system 108 determines a measure of loss by comparing the first intermediate depth map $\hat{D}_1$ with the first ground truth depth map $D_1$ to calculate a loss. For example, the depth refinement system 108 determines the measure of loss according to a loss function $\mathcal{L}(\hat{D}_1, D_1)$. The depth refinement system 108 can utilize a variety of loss functions to determine the measure of loss. For example, the loss function can include a regression loss function (e.g., a mean square error function, a quadratic loss function, an L2 loss function, a mean absolute error/L1 loss function, mean bias error). Additionally, or alternatively, the loss function includes a classification-type loss function (e.g., a hinge loss/multi-class SVM loss function, cross entropy loss/negative log likelihood function).

In one or more embodiments, the depth refinement system 108 utilizes the measure of loss to modify parameters of the depth refinement model $\mathcal{R}_m$. For example, the depth refinement system 108 adjust parameters of the depth refinement model $\mathcal{R}_m$ to reduce the measure of loss. To illustrate, the depth refinement system 108 utilizes gradient descent and back-propagation approaches to modify parameters of the depth refinement model $\mathcal{R}_m$ to reduce the difference between the predicted depth map $\hat{D}_1$ and the depth map $D_1$.

Similarly, as shown in FIG. 5, the depth refinement system 108 also generates a predicted depth map utilizing the inverse digital segmentation mask 1-M. In particular, the depth refinement system 108 utilizes the depth refinement model $\mathcal{R}_m$ to generate a second predicted depth map $\hat{D}_2$ from the composite digital image I', the composite depth map D', and the inverse digital segmentation mask 1-M. Thus, in one or more embodiments, the depth refinement system 108 utilizes the following formulation to generate the second predicted depth map, $\hat{D}_2 = \mathcal{R}_m(D', I', 1-M)$.

Similar to the manner in which $\hat{D}_1$ reflects a predicted depth map corresponding to the first digital image $I_1$ and the first ground truth depth map $D_1$, the second predicted depth map $\hat{D}_2$ corresponds to the second digital image $I_2$ and the second ground truth depth map $D_2$. Indeed, the depth refinement system 108 generates the composite digital image I' to include a portion of the second digital image $I_2$ remaining after applying the inverse digital segmentation mask 1-M. Similarly, the depth refinement system 108 generates the composite depth map D' to include a portion of the second ground truth depth map $D_2$ remaining after applying the inverse digital segmentation mask 1-M. Moreover, the depth refinement system 108 generates $\hat{D}_2$ from the portion of the composite digital image I' remaining after applying the inverse digital segmentation mask 1-M. Thus, $\hat{D}_2$ reflects a predicted depth map corresponding to the first digital image $I_2$ and the second ground truth depth map $D_2$.

Accordingly, the depth refinement system 108 compares the second predicted depth map $\hat{D}_2$ and the second ground truth depth map $D_2$ to further modify parameters of the depth refinement model $\mathcal{R}_m$. In particular, the depth refinement system 108 compares the second intermediate depth map $\hat{D}_2$ with the second ground truth depth map $D_2$ to calculate a loss according to a loss function $\mathcal{L}(\hat{D}_2, D_2)$. Moreover, the depth refinement system 108 adjusts parameters of the depth refinement model $\mathcal{R}_m$ to reduce the calculated loss (e.g., by gradient descent and back-propagation).

Although FIG. 5 illustrates training the depth refinement model $\mathcal{R}_m$ utilizing a composite digital image I' (and training data corresponding to the composite digital image I'), the depth refinement system 108 can utilize a variety of composite digital images to train the depth refinement model $\mathcal{R}_m$. For example, the depth refinement system 108 can generate a second composite digital image (utilizing a second arbitrary mask, a third digital image, a third depth map, a fourth digital image, and a fourth depth map). The depth refinement system 108 can then generate additional predicted depth maps (e.g., a third predicted depth map and fourth predicted depth map) and further tune parameters of the depth refinement model $\mathcal{R}_m$. Indeed, in one or more embodiments, the depth refinement system 108 iteratively trains the depth refinement model $\mathcal{R}_m$ utilizing composite digital images for a threshold number of iterations (or until detecting satisfaction of a threshold convergence measure for parameters of the depth refinement model $\mathcal{R}_m$).

As mentioned above, in one or more embodiments, the depth refinement system 108 utilizes a two-stage training approach in training a depth refinement machine learning model. In particular, in one or more embodiments the depth refinement system 108 implements a second-stage training approach by introducing randomized perturbations to composite depth maps to simulate one or more inadequacies of initial depth estimates. By generating and perturbing composite depth maps, the depth refinement system 108 can implement a self-supervised training strategy to train a depth refinement machine learning model to generate refined depth maps utilizing a digital segmentation mask and an inverse segmentation mask as a guide for depth refinement. For example, FIG. 6 illustrates the depth refinement system 108 training a depth refinement machine learning model $\mathcal{R}_m$ using a perturbed composite depth map in accordance with one or more embodiments.

As illustrated in FIG. 6, the depth refinement system 108 generates a perturbed depth map $\mathcal{P}(D')$. In particular, the depth refinement system 108 generates the perturbed depth map $\mathcal{P}(D')$ by applying one or more perturbations to a depth map for a digital image. Thus, for instance, the depth refinement system 108 access a ground truth composite depth map for a training composite digital image I' and applies perturbations to the ground truth composite depth map. The depth refinement system 108 can utilize a variety of perturbations. For example, perturbations can include introduction of (random) dilations and erosion in the composite depth map, (random) blurring of the composite depth map, misalignment (translation) of the composite depth map relative to the corresponding composite digital image, and obscuring of holes or gaps within the composite depth map (such as holes or gaps between the arm and body of human subjects portrayed within the corresponding composite digital image).

Moreover, as shown, the depth refinement system 108 also determines a digital segmentation mask M and corresponding inverse segmentation mask 1-M In one or more embodiments, the depth refinement system 108 utilizes an arbitrary mask as the segmentation mask M. In addition, the depth refinement system generates the inverse digital segmentation mask 1-M by inverting the digital segmentation mask M. Thus, in some implementations, the depth refinement system 108 utilizes a digital segmentation mask and inverse digital segmentation mask utilized in generating the composite digital image I' and the composite depth map D' as described above in relation to FIG. 4.

As illustrated in FIG. 6, the depth refinement system 108 generates intermediate depth maps utilizing the depth refinement model $\mathcal{R}_m$. In particular, the depth refinement system 108 generates a first intermediate depth map $\hat{D}_1$ utilizing the depth refinement model $\mathcal{R}_m$ from the composite digital image I', the digital segmentation mask M, and the perturbed depth map $\mathcal{P}(D')$. Thus, for example, the depth refinement system generates the first intermediate depth map utilizing the following formulation: $\hat{D}_1 = \mathcal{R}_m(\mathcal{P}(D'), I', M)$.

Moreover, as shown, the depth refinement system 108 compares the first intermediate depth map $\hat{D}_1$ with a first ground truth depth map $D_1$. In particular, the depth refinement system 108 determines a first loss according to the loss function $\mathcal{L}(\hat{D}_1, D_1)$. Moreover, as discussed previously, the depth refinement system 108 adjusts parameters of the depth refinement model $\mathcal{R}_m$ based on the first loss.

Similarly, as shown in FIG. 6, the depth refinement system 108 generates a second intermediate depth map $\hat{D}_2$. Specifically, the depth refinement system 108 generates a second intermediate depth map $D_2$ utilizing the depth refinement model $\mathcal{R}_m$ from the composite digital image I', the inverse digital segmentation mask 1-M, and the perturbed depth map $\mathcal{P}(D')$. Thus, for example, the depth refinement system generates the first intermediate depth map utilizing the following formulation $\hat{D}_2 = \mathcal{R}_m(\mathcal{P}(D'), I', 1-M)$.

In addition, similar to the first intermediate depth map $D_1$, the depth refinement system 108 compares the second intermediate depth map $\hat{D}_2$ with a second ground truth depth map $D_2$. Specifically, the depth refinement system calculates a second loss according to the loss function $\mathcal{L}(\hat{D}_2, D_2)$ and adjusts parameters of the depth refinement model $\mathcal{R}_m$ to reduce the calculated second loss.

As also illustrated in FIG. 6, the depth refinement system 108 additionally trains the depth refinement model $\mathcal{R}_m$ based on a predicted refined depth map. For instance, the depth refinement system combines/merge intermediate depth maps into a refined depth map and trains the depth refinement model $\mathcal{R}_m$ utilizing the refined depth map. Specifically, as shown in FIG. 6, the depth refinement system 108 merges the first intermediate depth map $\hat{D}_1$ and the second intermediate depth map $\hat{D}_2$ to predict (i.e., generate) a refined depth map $\hat{D}'$ for the composite digital image I'. For example, as illustrated, the depth refinement system 108 merges the first intermediate depth map $\hat{D}_1$ and the second intermediate depth map $\hat{D}_2$ according to the equation $\hat{D}' = M \cdot \hat{D}_1 + (1-M) \cdot \hat{D}_1$ to produce the refined depth map $\hat{D}'$.

In addition, the depth refinement system 108 compares the refined depth map $\hat{D}'$ with a composite depth map. In particular, the dept refinement system 108 the composite depth map D' (without perturbations) to calculate a third loss according to the loss function $\mathcal{L}(\hat{D}', D')$. Moreover, the depth refinement system 108 adjusts parameters of the depth refinement model $\mathcal{R}_m$ to reduce the calculated third loss.

Figure 7:
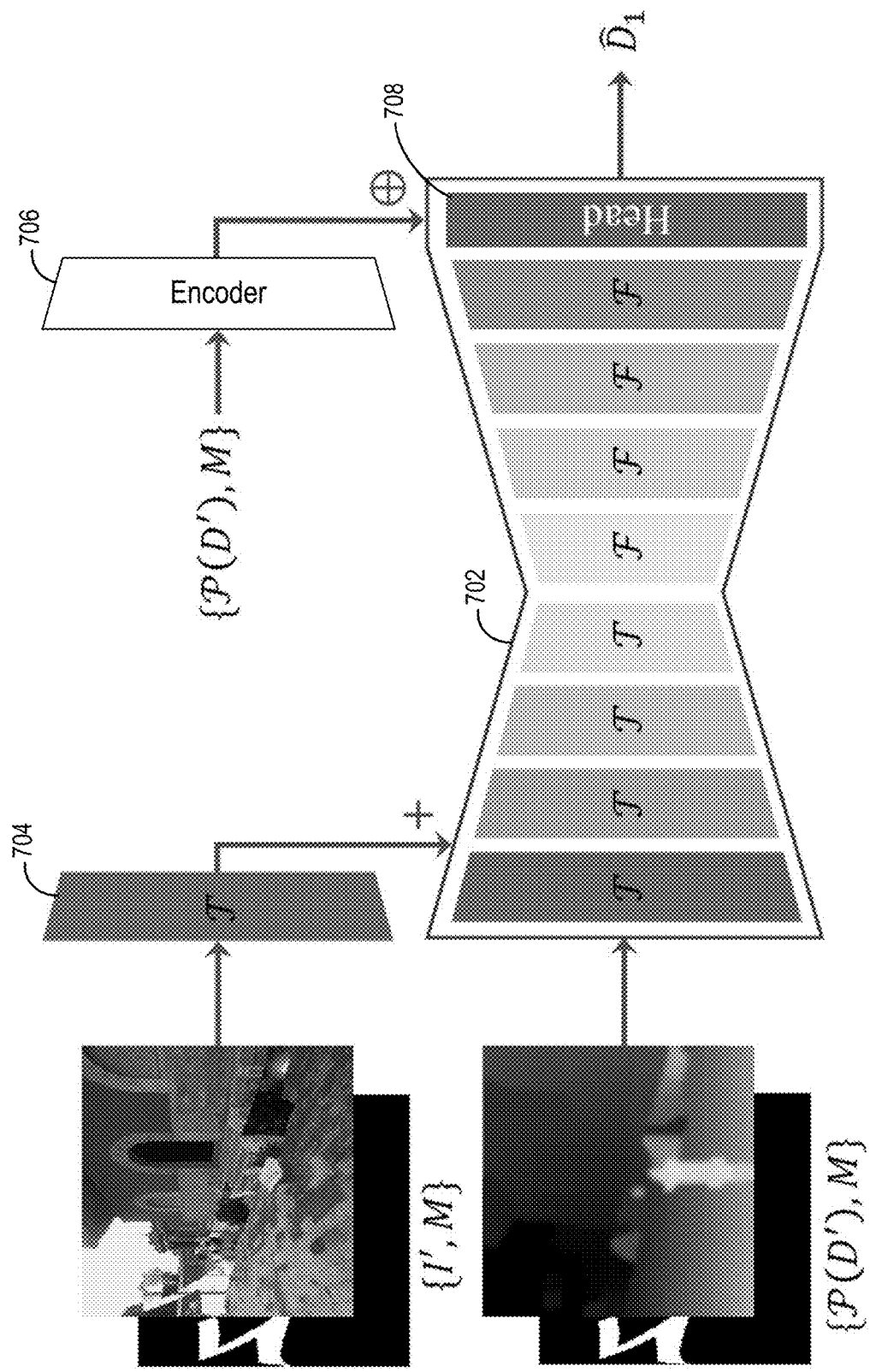
FIG. 7 illustrates a network architecture of a depth refinement neural network in accordance with one or more embodiments.

Although FIGS. 6-7 illustrate a two-stage training approach, in one or more embodiments the depth refinement system 108 utilizes a single stage (or different order of stages) to train the depth refinement model $\mathcal{R}_m$. For example, in some implementations the depth refinement system 108 utilizes the training approach described in FIG. 5 (without the second stage described in FIG. 6). In some implementations, the depth refinement system 108 utilizes the training approach described in FIG. 6 (without the first stage described in FIG. 5). Moreover, in some embodiments the depth refinement system 108 implements the second stage (described in FIG. 6) before the first stage (described in FIG. 5) or in an iterative multi-stage approach (e.g., first stage, second stage, first stage, second stage, etc.).

Moreover, although FIGS. 2-6 illustrate utilizing a single digital image mask, in one or more embodiments, the depth refinement system 108 utilizes multiple digital segmentation masks. For instance, the depth refinement system 108 can utilize a digital segmentation mask (and corresponding inverse digital segmentation mask) for each object identified in a digital image. Indeed, the depth refinement system 108 can generate a plurality of digital masks, determine a plurality of intermediate depth maps based on the plurality of digital masks, and combine the plurality of intermediate depth maps (utilizing the plurality of digital masks) to generate a refined depth map.

The depth refinement model 108 can utilize a variety of machine learning architectures. For example, FIG. 7 illustrates an exemplary depth refinement machine learning model architecture in accordance with one or more embodiments. As illustrated, the depth refinement model 108 includes a backbone model 702 comprised of a dense prediction transformer (DPT) with four transformer encoder levels $\mathcal{T}$ and four fusion decoder levels $\mathcal{F}$. Moreover, the backbone model 702 includes a monocular depth estimation head 708 following the decoder levels $\mathcal{F}$.

Further, the depth refinement system 108 implements an additional transformer layer 704. The depth refinement system 108 generates feature vectors for the digital image I' (i.e., RGB image) and mask M (or inverse mask 1-M) utilizing the additional transformer layer. Moreover, the depth refinement system 108 combines (e.g., adds or concatenates) the features vectors for the digital image I' and mask M (or inverse mask 1-M) with other feature vectors generated from the backbone model 702. For example, the backbone model 702 generates additional feature vectors from $\mathcal{P}(D')$ (or D') and M (or 1-M) in the initial transformer layers of the backbone model 702. Moreover, the depth refinement system 108 combines (e.g., adds) feature vectors and the additional feature vectors and feeds the combined feature vectors through the subsequent layers of the model.

Additionally, as shown, the depth refinement system 108 introduces a low-level encoder 706 to the backbone model 702. The low-level encoder 705 generates low-level feature vectors from the input depth map (e.g., D' or $\mathcal{P}$(D')) and/or mask M (or 1-M). The depth refinement system 108 combines (e.g., concatenates) these low-level features with the feature vectors from the fusion decoder levels $\mathcal{F}$. The depth refinement system 108 further processes these combined feature vectors utilizing the monocular depth estimation head 708.

Figure 8:
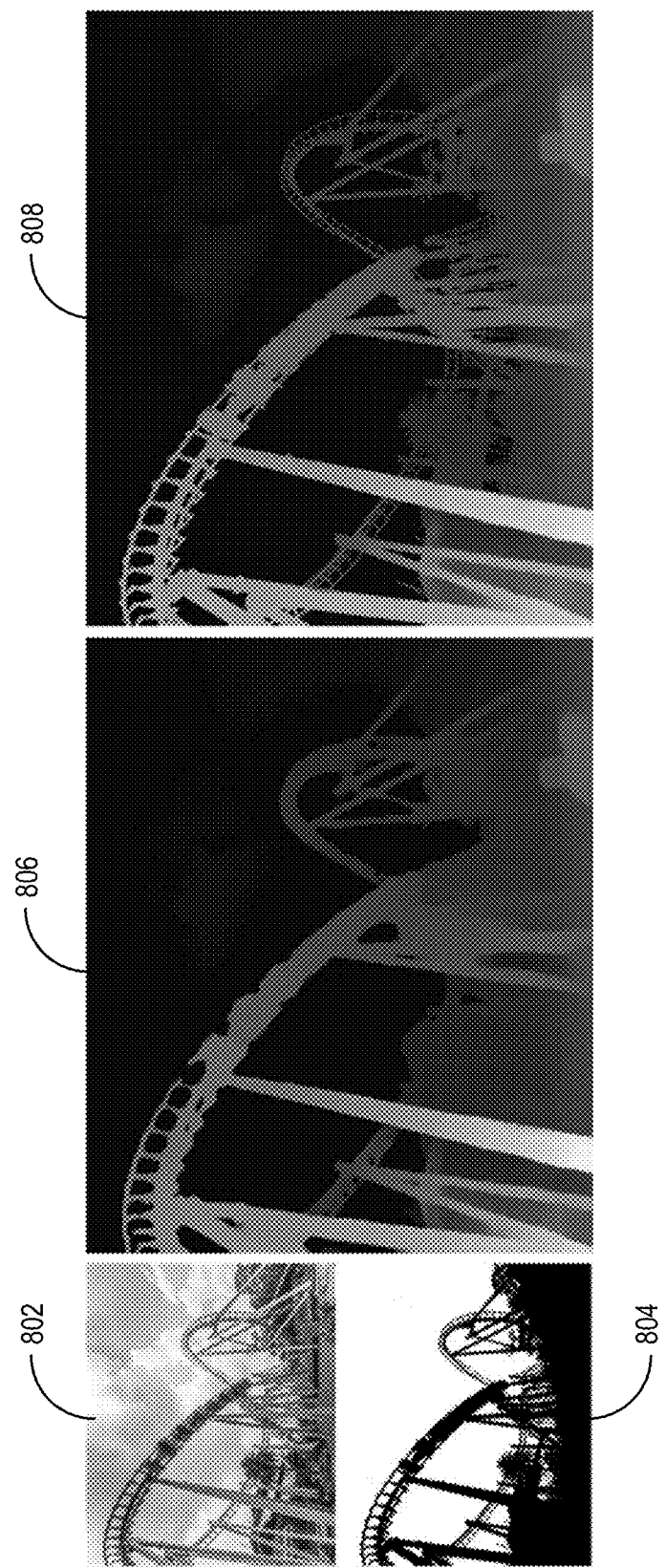
FIG. 8 illustrates experimental results of a depth refinement system utilizing a digital segmentation mask and an inverse digital segmentation mask in accordance with one or more embodiments.

As discussed above, the depth refinement system 108 provides a variety of technical advantages in generating refined depth maps. For example, FIGS. 8-12 show experimental results of example embodiments of the depth refinement system 108 to generate refined depth maps for digital images. For instance, FIG. 8 shows results of generating a refined depth map 808 for a digital image 802 from an initial depth map 806 based on a digital segmentation mask 804 using a depth refinement machine learning model according to one or more embodiments described herein. Indeed, as shown in FIG. 8, the refined depth map 808 exhibits increased clarity and improved resolution in comparison to the initial depth map 806 (generated using conventional methods for single image depth estimation).

Figure 9:
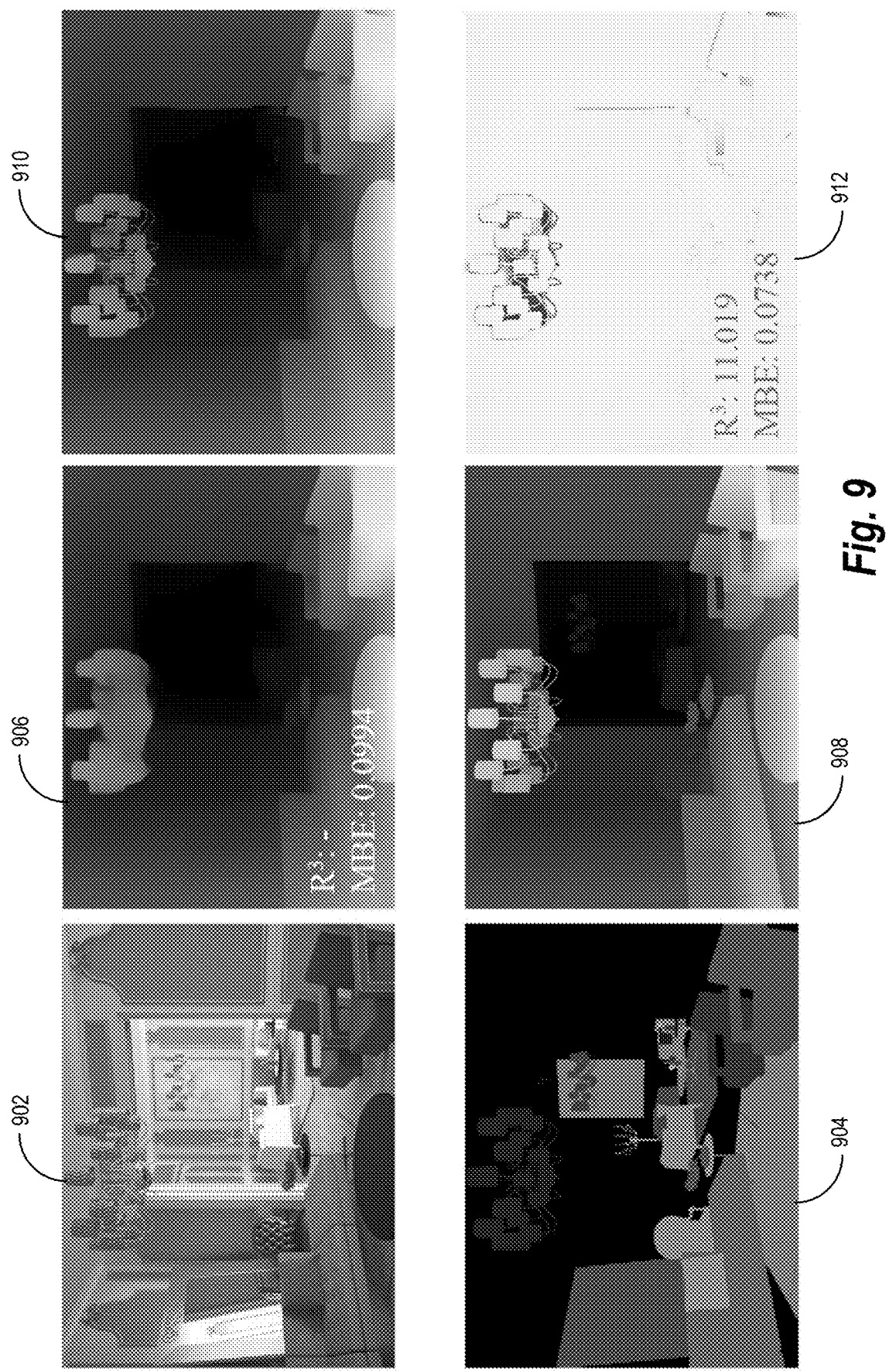
FIG. 9 illustrates experimental results of a depth refinement system utilizing a digital segmentation map comprising a plurality of digital segmentation masks in accordance with one or more embodiments.

Additionally, FIG. 9 shows results of generating a refined depth map 910 for a digital image 902 from an initial depth map 906 based on a digital segmentation map 904 using a depth refinement machine learning model according to one or more embodiments described herein. As shown, the digital segmentation map 904 includes multiple objects at various depths within the digital image 902. In some implementations, the digital segmentation map 904 is comprised of a plurality of digital segmentation masks, each portraying a different object (or objects) within the digital images. Also, FIG. 9 shows a ground truth depth map 908 and an improvement map 912 visualizing where the refined depth map 910 improved the initial depth map 906.

Indeed, as shown in FIG. 9, the refined depth map 910 (generated using methods disclosed herein) exhibits increased clarity and improved resolution, as well as increased fidelity to the ground truth depth map 908, in comparison to the initial depth map 906 (generated using conventional methods for single image depth estimation). Furthermore, the improvement map 912 indicates several regions and boundaries within the refined depth map 910 that show improved detail and fidelity to the ground truth depth map 908.

To further illustrate, FIG. 10 includes a table of experimental results of various depth map refinement methods. As shown, the table includes a comparison of the overall error of output depth maps by calculating the root mean square error (RMSE) and the weighted human disagreement rate (WHDR) measured on 10K randomly sample point pairs (see Weifeng Chen et al., *Single-Image Depth Perception in the Wild, in Advances in Neural Information Processing Systems*, 2016). To evaluate the boundary quality, the table includes the depth boundary error on accuracy, $\varepsilon_{acc}$, and completeness, $\varepsilon_{comp}$ (see Tobias Koch et al., *Evaluation of CNN-based Single-Image Depth Estimation Methods, in European Conference on Computer Vision Workshops*, 2018). In addition, the table includes metrics for mask boundary error (MBE) and relative refinement ratio ($R^3$). All metrics reported in the table of FIG. 10 are measured in the inverse depth space.

Moreover, as presented in FIG. 10, the MBE metric includes a computation of the average RMSE on mask boundary pixels over N instances. Mask boundary $M_i^e$ is obtained by subtracting an eroded $M_i$ from $M_i$ and dilating it with a 5×5 kernel. The MBE is calculated by:

$$MBE = \frac{1}{N} \sum_{i=1}^{N} \sqrt{\frac{1}{N_i^e} \sum (M_i^e \cdot D - M_i^e \cdot \hat{D}_i)^2}$$

wherein $N_i^e$ represents the number of boundary pixels for each instance i. As shown in FIG. 10, $\varepsilon_{acc}$, $\varepsilon_{comp}$, and MBE provide comprehensive metrics of the boundary accuracy of refined depth maps, wherein $\varepsilon_{acc}$ and $\varepsilon_{comp}$ focus on depth boundaries and MBE focuses on mask boundaries of the respective depth maps. Furthermore, the $R^3$ metric is defined as the ratio of the number of pixels that improved by more than a threshold t to the number of pixels that worsened by than t, in terms of absolute error. In the table of FIG. 10, t is set to a value of 0.05 in the computation of $R^3$ for each refined depth map to provide a meaningful performance indicator for comparison of the experimental results with those of conventional refinement models, Hyperism and TartanAir (described in additional detail below).

As shown in FIG. 10, example embodiments of the depth refinement system 108 were utilized to generate refined depth maps from initial depth predictions by two conventional SIDE models: MiDaS v2.1, which is a convolutional neural network-based SIDE model for depth estimation (see René Ranftl et al., *Towards Robust Monocular Depth Estimation: Mixing Datasets for Zero-Shot Cross-Dataset Transfer, in IEEE Transactions on Pattern Analysis and Machine Intelligence*, 2020), and DPT-Large, a recent transformer-based model with demonstrated accuracy (see René Ranftl et al., *Vision Transformers for Dense Prediction, in IEEE International Conference on Computer Vision*, 2021).

Furthermore, FIG. 10 includes experimental results of various experimental embodiments of the depth refinement system 108 as disclosed herein. As shown, the embodiment entitled "Direct-composite" produces the refined output without layering and is trained on composite images as described above in relation to FIGS. 4-5. Further, the embodiment entitled "Direct-paired" also refines without layering but is trained on paired RGB-D images and masks utilizing the Hyperism model; hence, as shown in FIG. 10, the results of Direct-paired are compared to those of TartanAir. Moreover, the included layered embodiments, "Layered-propogation" and "Layered-DRS", apply a propagation-based image completion algorithm (see, e.g., Alexandru Telea, *An Image Inpainting Technique Based on the Fast Marching Method, in Journal of Graphics Tools*, 2004) and a stage I training model (as disclosed above in relation to FIG. 5), respectively. Specifically, the training is performed once with a dilated mask for inpainting and then with an eroded mask for outpainting. The inpainted/outpainted results are then merged with the mask to produce the experimental results for comparison.

Indeed, as indicated by the quantitative results on mask-guided refinement methods shown in FIG. 10, embodiments of the depth refinement system 108 improve initial depth estimates from both MiDaS v2.1 and DPT-Large on all edge-related metrics ($\varepsilon_{acc}$, $\varepsilon_{comp}$, and MBE) and results in high $R^3$ values of at most 16.569. As shown in FIG. 10, however, WHDR and RMSE values are not particularly discriminative between mask-guided refinement methods as they measure the average error over all pixels, whereas mask-guided refinement methods aim at refining along mask boundaries and leave most internal regions as is. The provided experimental results indicate that experimental embodiments of the depth refinement system 108 outperform conventional models in $R^3$ and MBE, demonstrating the power of mask-guided and/or layered depth refinement models as disclosed herein.

Additionally, FIG. 11 includes a table of experimental results of various depth map refinement methods. As shown, the table includes results of bilateral median filtering (BMF), which has previously been used by conventional systems for refining depth maps (see Meng-Li Shih et al., 3*D Photography Using Context-Aware Layered Depth Painting, in IEEE Conference on Computer Vision and Pattern Recognition*, 2020). Also, the table includes results of a recent conventional depth refinement method, entitle "Mian." in FIG. 11 (see S. Mandi H. Miangoleh et al., *Boosting Monocular Depth Estimation Models to High-Resolution via Content-Adaptive Multi Resolution Merging, in IEEE Conference on Computer Vision and Pattern Recognition*, 2021). These approaches (BMF and Mian.) do not use digital segmentation masks as guidance in depth map refinement.

In particular, the table shown in FIG. 11 compares results of the depth refinement system 108 with methods without mask-guidance. Indeed, as shown in FIG. 11, conventional image filtering fails to enhance the edge-related metrics ($\varepsilon_{acc}$, $\varepsilon_{comp}$, and MBE). The Mian. method, for instance, is at times better on the global edge metrics ($\varepsilon_{acc}$, $\varepsilon_{comp}$) as it enhances all edges in the depth map; however, it also carries a risk of distorting the original values, such that $R^3$ values tend to be lower compared to results of the depth refinement system 108, which concentrates refinement along mask boundaries and leaves other regions intact. Furthermore, as the Mian. method greatly relies on the base depth estimation model's behavior; its generalization capability is limited for other architecture types such as a transformer. The disclosed depth refinement system 108 works well regardless of the base model architecture and generalizes well to any dataset, leading to the best metric values when coupled with DPT-Large initial depth estimation.

To further illustrate, FIG. 12 shows results of an ablation study of embodiments of the depth refinement system 108 trained according to the various training methods disclosed herein. As indicated in FIG. 12, Stage I (i.e., the training stage described above in relation to FIG. 5) improves the accuracy of the depth refinement system 108 by starting with improved initial parameters. Additionally, Stage II (i.e., the training stage described above in relation to FIG. 6) particularly improves the depth refinement system 108 for layered refinement of depth maps. Furthermore, the experiments results provided in FIG. 12 demonstrate that the disclosed training methods significantly improve depth maps around holes in portrayed objects, such as those exhibited by a human object, such as the gap between an arm and a torso. Moreover, as demonstrated by FIG. 12, the depth refinement system 108 can utilize various combinations of Stage I, Stage II, and/or perturbations in training.

Figure 13:
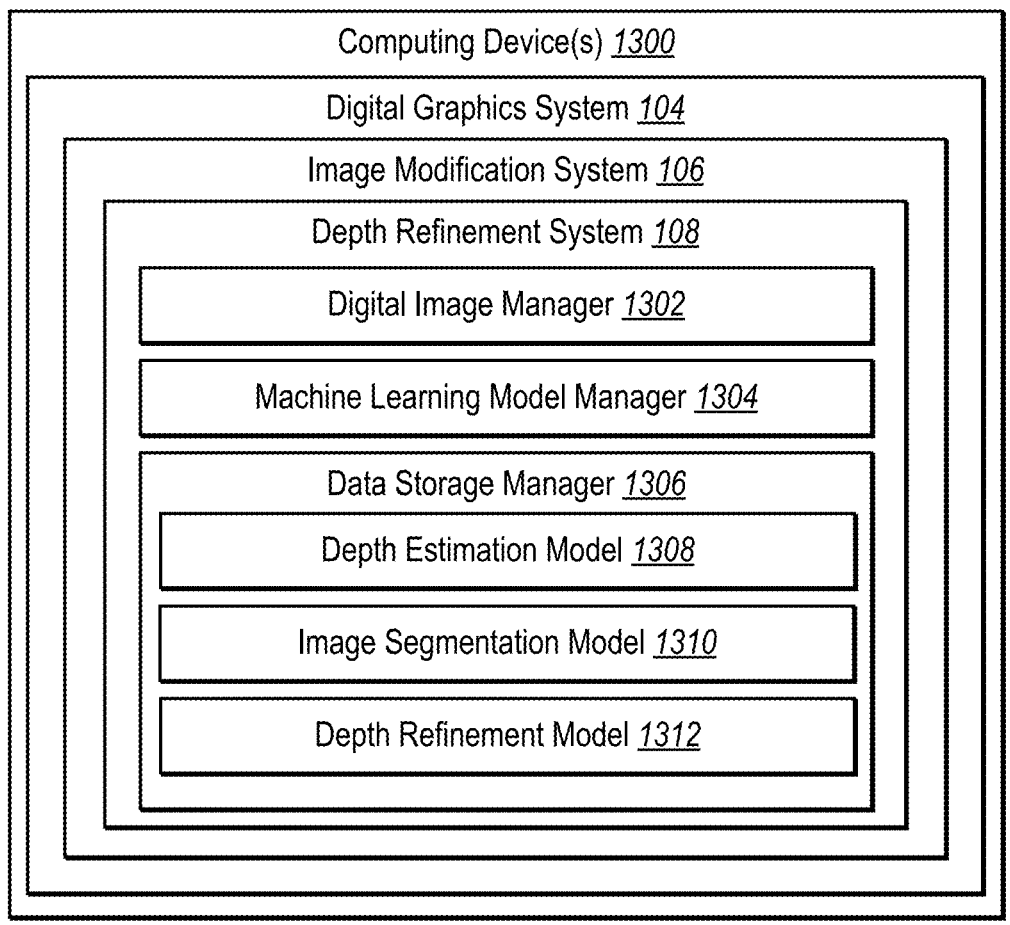
FIG. 13 illustrates a schematic diagram of a depth refinement system in accordance with one or more embodiments.

Turning now to FIG. 13, additional detail will be provided regarding components and capabilities of one or more embodiments of the depth refinement system 108. In particular, FIG. 13 illustrates an example depth refinement system 108 executed by a computing device 1300 (e.g., the server devices(s) 102 or the client device 112). As shown by the embodiment of FIG. 13, the computing device 1300 includes or hosts a digital graphics system 104, the image modification system 106, and/or the depth refinement system 108. Furthermore, as shown in FIG. 13, the depth refinement system 108 includes a digital image manager 1302, a machine learning model manager 1304, a data storage manager 1306, a depth estimation model 1308, an image segmentation machine learning model 1310, and a depth refinement machine learning model 1312.

As just mentioned, and as illustrated in the embodiment of FIG. 13, the depth refinement system 108 includes the digital image manager 1302. For instance, the digital image manager 1302 identifies, stores, transmits, and/or displays digital images (and/or composite digital images) as described above (e.g., in relation to FIGS. 1-4). In some instances, the digital image manager 1302 stores digital images with corresponding depth maps pre-generated by a depth estimation model as described above (e.g., in relation to FIGS. 1-3), and/or composite digital images with corresponding ground truth depth maps and composite depth maps.

Furthermore, as shown in FIG. 13, the depth refinement system 108 includes the machine learning model manager 1304. For instance, the machine learning model manager 1304 manages the various machine learning models described herein, such as the depth estimation model 1308 (e.g., as described above in relation to FIGS. 1-3), the image segmentation model 1310 (e.g., as described above in relation to FIG. 1-3), and the depth refinement model 1312 (e.g., as described above in relation to FIGS. 1-7).

As also shown in FIG. 13, the depth refinement system 108 includes the data storage manager 1306. In some embodiments, the data storage manager 1306 is implemented by one or more memory devices. Additionally, in certain instances, the data storage manager 1306 maintains data to perform one or more functions of the depth refinement system 108. For example, the data storage manager 1306 includes digital images, machine learning model and/or neural network components (e.g., parameters, channel weights) of the depth estimation model 1308, the image segmentation model 1310, and/or the depth refinement model 1312.

Each of the components 1306-1312 of the depth refinement system 108 can include software, hardware, or both. For example, the components 1306-1312 can include one or more instructions stored on a computer-readable storage medium and executable by processors of one or more computing devices, such as a client device or server device. When executed by the one or more processors, the computer-executable instructions of the depth refinement system 108 can cause the computing device(s) 1300 to perform the methods described herein. Alternatively, the components 1306-1312 can include hardware, such as a special-purpose processing device to perform a certain function or group of functions. Alternatively, the components 1306-1312 of the depth refinement system 108 can include a combination of computer-executable instructions and hardware.

Furthermore, the components 1306-1312 of the depth refinement system 108 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1306-1312 may be implemented as a stand-alone application, such as a desktop or mobile application. Furthermore, the components 1306-1312 may be implemented as one or more web-based applications hosted on a remote server. The components 1306-1312 may also be implemented in a suite of mobile device applications or "apps." To illustrate, the components 1306-1312 may be implemented in an application, including but not limited to, ADOBE PHOTOSHOP, ADOBE PREMIERE, ADOBE LIGHTROOM, ADOBE ILLUSTRATOR, ADOBE SUBSTANCE, ADOBE CREATIVE CLOUD, or ADOBE STOCK. The foregoing are either registered trademarks or trademarks of Adobe Systems Incorporated in the United States and/or other countries.

Figure 14:
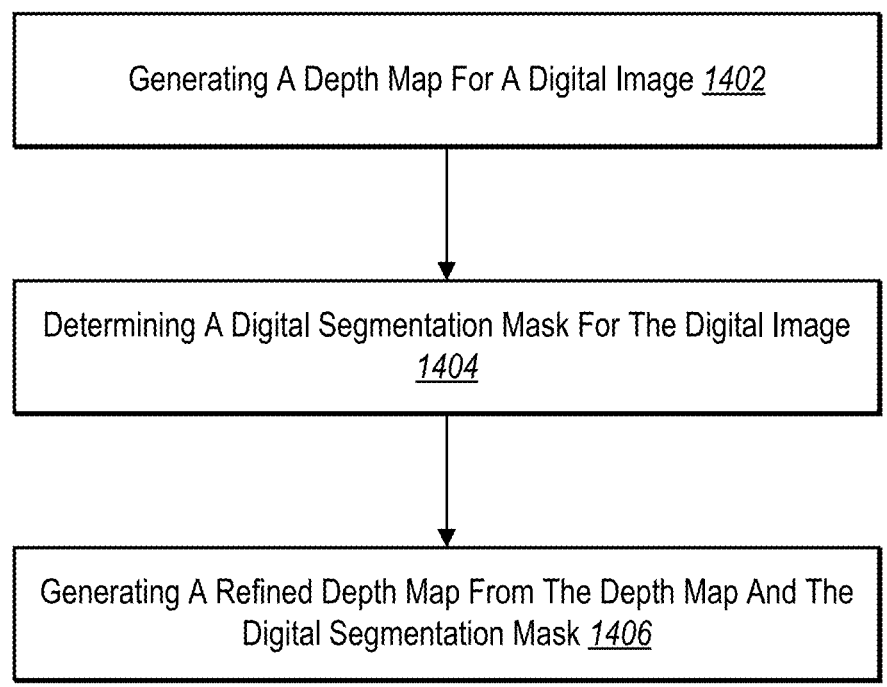
FIG. 14 illustrates a flowchart of a series of acts for generating a refined depth map in accordance with one or more embodiments.

FIGS. 1-13, the corresponding text, and the examples provide a number of different methods, systems, devices, and non-transitory computer-readable media of the depth refinement system 108. In addition to the foregoing, one or more embodiments can also be described in terms of flowcharts comprising acts for accomplishing a particular result, as shown in FIG. 14. The acts shown in FIG. 14 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 14. In some embodiments, a system can be configured to perform the acts of FIG. 14. Alternatively, the acts of FIG. 14 can be performed as part of a computer-implemented method.

As mentioned above, FIG. 14 illustrates a flowchart of a series of acts 1400 for generating a refined depth map for a digital image in accordance with one or more embodiments. While FIG. 14 illustrates acts according to one embodiment, alternative embodiments may omit, add to, reorder, and/or modify any acts shown in FIG. 14. Furthermore, as previously mentioned, the methods described herein can be implemented to generate various environment maps of different data types, such as but not limited to refined normal maps, refined depth maps, refined inverse depth maps, refined semantic segmentation maps, refined optical flow maps, refined contrast maps, or refined infrared maps.

As shown in FIG. 14, the series of acts 1400 includes an act 1402 of generating a depth map for a digital image. In particular, in one or more embodiments, the act 1402 includes generating a depth map for a digital image utilizing a depth estimation machine learning model. Further, in some embodiments, the act 1402 includes determining an initial depth map for a digital image utilizing a depth estimation neural network. Additionally, in some embodiments, the act 1402 can include generating an initial environment map for a digital image utilizing an environment map estimation machine learning model or neural network. Moreover, the act 1402 can include generating an initial environment map by generating at least one of an initial depth map, an initial inverse depth map, an initial semantic segmentation map, and initial optical flow map, an initial image contrast map, or an initial infrared map.

As shown in FIG. 14, the series of acts 1400 includes an act 1404 of determining a digital segmentation mask for the digital image. For example, in some embodiments, the act 1404 includes determining a digital segmentation mask for the digital image, the digital segmentation mask indicating one or more objects portrayed in the digital image. Further, in one or more embodiments, the act 1404 includes determining the digital segmentation mask utilizing an image segmentation machine learning model. Also, in some embodiments, the act 1404 includes generating a plurality of digital segmentation masks for the digital image utilizing a segmentation neural network. Additionally, in some embodiments, the act 1404 includes generating the plurality of digital segmentation masks by generating a first digital segmentation mask for a first object portrayed at a first depth within the digital image and generating a second digital segmentation mask for a second object portrayed at a second depth within the digital image.

As shown in FIG. 14, the series of acts 1400 includes an act 1406 of generating a refined depth map from the depth map and the digital segmentation mask. For instance, in one or more embodiments, the act 1406 includes generating a refined depth map, utilizing a depth refinement machine learning model, from the depth map and the digital segmentation mask. Further, in some embodiments, the act 1406 includes generating the refined depth map by refining the depth map along one or more boundaries indicated by the digital segmentation mask. Additionally, in one or more embodiments, the act 1406 includes generating a first intermediate depth map utilizing the depth refinement machine learning model from the depth map and the digital segmentation mask and generating a second intermediate depth map utilizing the depth refinement machine learning model from the depth map and an inverse digital segmentation mask. Further, in some embodiments, the act 1406 includes generating the refined depth map comprises merging the first intermediate depth map and the second intermediate depth map to generate the refined depth map.

Moreover, in some embodiments, the act 1406 includes generating a first intermediate depth map from an initial depth map, a digital image, and a digital segmentation mask utilizing a depth refinement neural network; generating a second intermediate depth map from the initial depth map, the digital image, and an inverse digital segmentation mask utilizing the depth refinement neural network; and merging the first intermediate depth map and the second intermediate depth map to determine a refined depth map for the digital image. Further, in one or more embodiments, the act 1406 includes generating the first intermediate depth map by refining one or more regions of the initial depth map based on one or more boundaries of the digital segmentation mask; and generating the second intermediate depth map by refining one or more regions of the initial depth map based on one or more boundaries of the inverse digital segmentation mask.

Also, in some embodiments, the act 1406 includes generating a plurality of intermediate depth maps based on the plurality of digital segmentation masks utilizing a depth refinement neural network and merging the plurality of intermediate depth maps to determine a refined depth map for the digital image. Further, in some embodiments, the act 1406 includes generating the plurality of intermediate depth maps by utilizing the depth refinement neural network to refine a plurality of regions of the initial depth map based on the plurality of digital segmentation masks and a plurality of inverse digital segmentation masks corresponding to the plurality of digital segmentation masks.

Alternatively, in some embodiments, the act 1406 can include generating a first intermediate environment map from an initial environment map, a digital image, and a digital segmentation mask utilizing a map refinement neural network; generating a second environment map from the initial environment map, the digital image, and an inverse digital segmentation mask utilizing the map refinement neural network; and merging the first intermediate environment map and the second intermediate environment map to determine a refined environment map for the digital image. Further, the act 1406 can include generating the first intermediate environment map and the second intermediate environment map by generating a first intermediate depth map and a second intermediate depth map utilizing a depth refinement neural network. Moreover, the act 1406 can include generating the first environment map, the second environment map, and/or the refined environment map by generating at least one of a refined depth map, a refined semantic segmentation map, a refined optical flow map, a refined image contrast map, or a refined infrared map.

Additionally, in one or more embodiments, the series of acts 1400 includes an act (not depicted in FIG. 14) for training a depth refinement machine learning model to generate refined depth maps for digital images, including modifying, in response to generating the refined depth map, one or more parameters of the depth refinement machine learning model based on comparing the refined depth map with a ground truth depth map. Also, in some embodiments, the act for training the depth refinement machine learning model includes an act for modifying parameters of the depth refinement machine learning model based on comparing the first intermediate depth map with a first ground truth depth map and comparing the second intermediate depth map with a second ground truth depth map. Further, in one or more embodiments, the act for training the depth refinement machine learning model includes modifying one or more parameters of the depth refinement machine learning model based on comparing the refined depth map with a composite ground truth depth map. Further still, in some embodiments, the act for training the depth refinement machine learning model includes generating the composite ground truth depth map by combining of a first ground truth depth map corresponding to the digital segmentation mask and a second ground truth depth map corresponding to the inverse digital segmentation mask.

Also, in one or more embodiments, the series of acts 1400 includes an act (not depicted in FIG. 14) for generating training data for a depth refinement neural network, including extracting an image excerpt of a first digital image and a depth map excerpt of a first ground truth depth map of the first digital image based on the digital segmentation mask and combining the image excerpt with a second digital image to generate the composite digital image. Further, in some embodiments, the act for generating training data includes combining the depth map excerpt with a second ground truth depth map of the second digital image to generate a composite depth map of the composite digital image.

Moreover, in some embodiments, the series of acts 1400 includes an act (not depicted in FIG. 14) for training the depth refinement neural network to generate refined depth maps for digital images, including modifying, in response to generating the first intermediate depth map, one or more parameters of the depth refinement neural network to reduce a measure of loss between the first intermediate depth map and the first ground truth depth map; or modifying, in response to generating the second intermediate depth map, one or more parameters of the depth refinement neural network to reduce a loss between the second intermediate depth map and a second ground truth depth map of the second digital image. Further, in some embodiments, the act for training the depth refinement neural network includes altering the composite depth map with one or more randomized perturbations to generate the perturbed depth map and modifying one or more parameters of the depth refinement neural network to reduce a measure of loss between the first intermediate depth map and the first ground truth depth map. Further still, in some embodiments, the act for training the depth refinement neural network includes modifying the one or more parameters of the depth refinement neural network to reduce a measure of loss between the refined depth map and the composite depth map.

Moreover, in some embodiments, the series of acts 1400 include an act (not depicted in FIG. 14) for utilizing the refined depth map to generate a modified digital image from the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
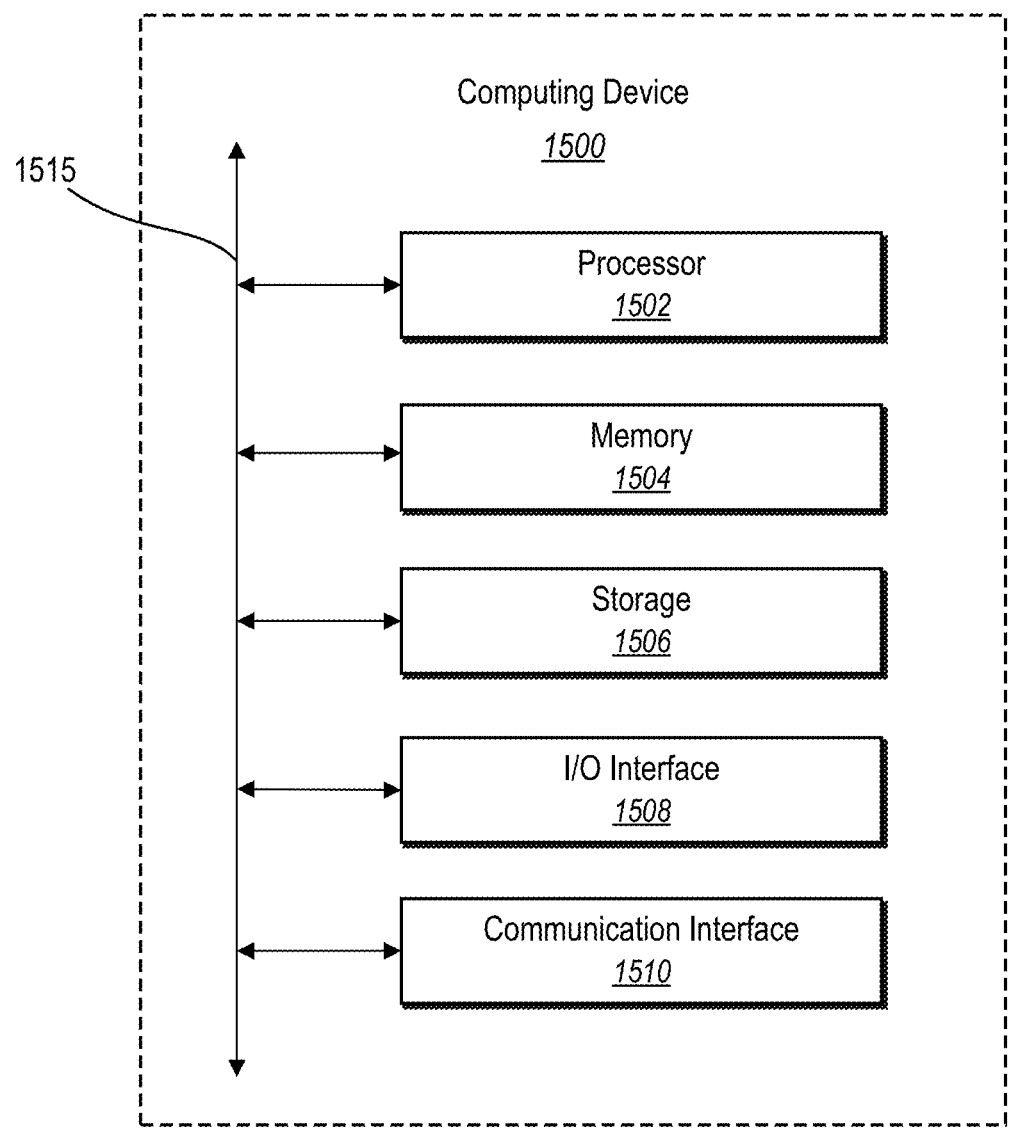
FIG. 15 illustrates a block diagram of an example computing device for implementing one or more embodiments of the present disclosure.

FIG. 15 illustrates a block diagram of an example computing device 1500 that may be configured to perform one or more of the processes described above. One will appreciate that one or more computing devices, such as the computing device 1500 may represent the computing devices described above (e.g., server device(s) 102, client device 112, and computing device(s) 1000). In one or more embodiments, the computing device 1500 may be a mobile device (e.g., a mobile telephone, a smartphone, a PDA, a tablet, a laptop, a camera, a tracker, a watch, a wearable device, etc.). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface

1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
   generating a depth map for a digital image utilizing a depth estimation machine learning model;
   determining a digital segmentation mask for the digital image, the digital segmentation mask indicating one or more objects portrayed in the digital image;
   generating a first intermediate depth map for the digital image, utilizing a depth refinement machine learning model, from the depth map and the digital segmentation mask for the digital image;
   generating a second intermediate depth map for the digital image, utilizing the depth refinement machine learning model, from the depth map and an inverse of the digital segmentation mask for the digital image; and
   combining the first intermediate depth map and the second intermediate depth map to generate a refined depth map for the digital image.

2. The non-transitory computer-readable medium of claim 1, wherein generating the refined depth map comprises refining the depth map along one or more boundaries indicated by the digital segmentation mask.

3. The non-transitory computer-readable medium of claim 1, wherein generating the refined depth map comprises:
   generating a first intermediate depth map utilizing the depth refinement machine learning model from the depth map and the digital segmentation mask; and
   generating a second intermediate depth map utilizing the depth refinement machine learning model from the depth map and an inverse digital segmentation mask.

4. The non-transitory computer-readable medium of claim 3, wherein generating the refined depth map comprises merging the first intermediate depth map and the second intermediate depth map to generate the refined depth map.

5. The non-transitory computer-readable medium of claim 1, further comprising instructions that, when executed by the at least one processor, cause the at least one processor to determine the digital segmentation mask utilizing an image segmentation machine learning model.

6. The non-transitory computer-readable medium of claim 1, further comprising instructions that, when executed the at least one processor, cause the at least one processor to utilize the refined depth map to generate a modified digital image from the digital image.

7. The non-transitory computer-readable medium of claim 1, further comprising instructions that, when executed by the at least one processor, cause the at least one processor to perform operations comprising modifying, in response to generating the refined depth map, one or more parameters of the depth refinement machine learning model based on comparing the refined depth map with a ground truth depth map.

8. The non-transitory computer-readable medium of claim 3, further comprising instructions that, when executed by the at least one processor, cause the at least one processor to perform operations comprising:
   modifying parameters of the depth refinement machine learning model based on comparing the first intermediate depth map with a first ground truth depth map and comparing the second intermediate depth map with a second ground truth depth map.

9. The non-transitory computer-readable medium of claim 4, further comprising instructions that, when executed by the at least one processor, cause the at least one processor to modify one or more parameters of the depth refinement machine learning model based on comparing the refined depth map with a composite ground truth depth map.

10. The non-transitory computer-readable medium of claim 9, further comprising instructions that, when executed by the at least one processor, cause the at least one processor to perform operations comprising generating the composite ground truth depth map by combining of a first ground truth depth map corresponding to the digital segmentation mask and a second ground truth depth map corresponding to the inverse digital segmentation mask.

11. A system comprising:
   one or more memory devices; and
   one or more processors coupled to the one or more memory devices that cause the system to perform operations comprising:
      generating, utilizing a map refinement neural network, a first intermediate environment map of a digital image from an initial environment map of the digital image and a digital segmentation mask for the digital image;
      generating, utilizing the map refinement neural network, a second intermediate environment map of the digital image from the initial environment map of the digital image and an inverse of the digital segmentation mask for the digital image; and merging the first intermediate environment map and the second intermediate environment map to determine a refined environment map for the digital image.

12. The system of claim 11, wherein the one or more processors are further configured to cause the system to perform operations comprising:
generate the first intermediate environment map by generating at least one of a refined depth map, a refined normal map, a refined semantic segmentation map, a refined optical flow map, a refined image contrast map, or a refined infrared map; and
generate the refined environment map by generating at least one of a refined depth map, a refined normal map, a refined semantic segmentation map, a refined optical flow map, a refined image contrast map, or a refined infrared map.

13. The system of claim 11, wherein the digital image comprises a composite digital image, and wherein the one or more processors are further configured to cause the system to perform operations comprising:
generating the first intermediate environment map and the second intermediate environment map by generating a first intermediate depth map and a second intermediate depth map utilizing a depth refinement neural network;
extracting an image excerpt of a first digital image and a depth map excerpt of a first ground truth depth map of the first digital image based on the digital segmentation mask; and
combining the image excerpt with a second digital image to generate the composite digital image.

14. The system of claim 13, wherein the one or more processors are further configured to cause the system to perform operations comprising:
modifying, in response to generating the first intermediate depth map, one or more parameters of the depth refinement neural network to reduce a measure of loss between the first intermediate depth map and the first ground truth depth map; or
modifying, in response to generating the second intermediate depth map, one or more parameters of the depth refinement neural network to reduce a measure of loss between the second intermediate depth map and a second ground truth depth map of the second digital image.

15. The system of claim 13, wherein the one or more processors are further configured to cause the system to perform operations comprising combining the depth map excerpt with a second ground truth depth map of the second digital image to generate a composite depth map of the composite digital image.

16. The system of claim 15, wherein the initial environment map comprises a perturbed depth map, and wherein the one or more processors are further configured to cause the system to perform operations comprising:
altering the composite depth map with one or more perturbations to generate the perturbed depth map; and
modifying one or more parameters of the depth refinement neural network to reduce a measure of loss between the first intermediate depth map and the first ground truth depth map.

17. The system of claim 16, wherein the refined environment map comprises a refined depth map and the one or more processors are further configured to cause the system to perform operations comprising:
modifying the one or more parameters of the depth refinement neural network to reduce a measure of loss between the refined depth map and the composite depth map.

18. A computer-implemented method comprising:
determining an initial depth map for a digital image utilizing a depth estimation neural network;
generating a plurality of digital segmentation masks for the digital image utilizing a segmentation neural network;
generating a plurality of inverse digital segmentation masks corresponding to the plurality of digital segmentation masks;
generating a first plurality of intermediate depth maps for the digital image based on the plurality of digital segmentation masks and a second plurality of intermediate depth maps for the digital image based on the plurality of inverse digital segmentation masks utilizing a depth refinement neural network; and
merging the first plurality of intermediate depth maps and the second plurality of intermediate depth maps to determine a refined depth map for the digital image.

19. The computer-implemented method of claim 18, further comprising generating the plurality of digital segmentation masks by generating a first digital segmentation mask for a first object portrayed at a first depth within the digital image and generating a second digital segmentation mask for a second object portrayed at a second depth within the digital image.

20. The computer-implemented method of claim 18, wherein generating the first plurality of intermediate depth maps and the second plurality of intermediate depth maps comprises utilizing the depth refinement neural network to refine a plurality of regions of the initial depth map based on the plurality of digital segmentation masks and the plurality of inverse digital segmentation masks, respectively.

* * * * *